US010223001B2

(12) United States Patent
Saito et al.

(10) Patent No.: US 10,223,001 B2
(45) Date of Patent: Mar. 5, 2019

(54) MEMORY SYSTEM

(71) Applicant: Toshiba Memory Corporation, Minato-ku, Tokyo (JP)

(72) Inventors: Yoshiki Saito, Kanagawa (JP); Kiyotaka Iwasaki, Kanagawa (JP)

(73) Assignee: Toshiba Memory Corporation, Tokyo (JP)

( * ) Notice: Subject to any disclaimer, the term of this patent is extended or adjusted under 35 U.S.C. 154(b) by 134 days.

(21) Appl. No.: 14/794,122

(22) Filed: Jul. 8, 2015

(65) Prior Publication Data

US 2016/0266793 A1    Sep. 15, 2016

Related U.S. Application Data

(60) Provisional application No. 62/132,389, filed on Mar. 12, 2015.

(51) Int. Cl.
   *G06F 3/06* (2006.01)
   *G06F 12/02* (2006.01)

(52) U.S. Cl.
   CPC .......... *G06F 3/0611* (2013.01); *G06F 3/0656* (2013.01); *G06F 3/0679* (2013.01); *G06F 12/02* (2013.01)

(58) Field of Classification Search
   CPC ...... G06F 3/0611; G06F 12/02; G06F 3/0679; G06F 3/0656
   See application file for complete search history.

(56) References Cited

U.S. PATENT DOCUMENTS

| | | | |
|---|---|---|---|
| 6,330,645 B1 * | 12/2001 | Harriman ............ | G06F 13/1626 711/147 |
| 8,612,721 B2 | 12/2013 | Asano et al. | |
| 8,725,932 B2 | 5/2014 | Yano et al. | |
| 8,872,903 B2 | 10/2014 | Sugiyama | |
| 9,170,939 B1 * | 10/2015 | Jones .................. | G06F 12/0246 |
| 2012/0179863 A1 | 7/2012 | Hatsuda et al. | |
| 2012/0233382 A1 | 9/2012 | Yamanaka et al. | |
| 2012/0331267 A1 * | 12/2012 | Lin ..................... | G06F 12/0246 711/209 |
| 2013/0111116 A1 | 5/2013 | Inada et al. | |
| 2013/0159815 A1 * | 6/2013 | Jung ....................... | G06F 11/10 714/773 |

(Continued)

FOREIGN PATENT DOCUMENTS

| | | |
|---|---|---|
| JP | 2010-157139 A | 7/2010 |
| JP | 2012-068863 A | 4/2012 |

(Continued)

*Primary Examiner* — David Yi
*Assistant Examiner* — Zubair Ahmed
(74) *Attorney, Agent, or Firm* — White & Case LLP

(57) ABSTRACT

When receiving a write command from a host, a memory system according to one embodiment updates first correspondence information indicating the correspondence relationship between a logical address corresponding to user data and a position in a first memory and transmits the user data which has been stored in a second memory to the first memory. When the transmission is completed, the memory system writes the user data to the first memory. When the update and the transmission are completed, the memory system releases a memory area which stores the user data such that the memory area can be used as a memory area for other data.

17 Claims, 15 Drawing Sheets

(56) References Cited

U.S. PATENT DOCUMENTS

2013/0282961 A1   10/2013  Minamimoto
2015/0248244 A1*  9/2015  Seo ...................... G06F 3/0611
                                                                   711/103

FOREIGN PATENT DOCUMENTS

| JP | 2012-142752 A | 7/2012 |
| --- | --- | --- |
| JP | 5010732 B2 | 8/2012 |
| JP | 2012-190331 A | 10/2012 |
| JP | 2013-206307 A | 10/2013 |
| JP | 2013-222435 A | 10/2013 |
| JP | 5317690 B2 | 10/2013 |
| JP | 5330432 B2 | 10/2013 |

* cited by examiner

| Valid | SET IDENTIFI-CATION NUMBER | Dirty | LUT PHYSICAL ADDRESS IN BUFFER | USER DATA NAND WRITE COMPLETION INFORMATION |
|---|---|---|---|---|
| | | | | |
| | | | | |
| | | | | |

FIG.13

| Valid | SET INDENTIFICATION NUMBER | Dirty | LUT PHYSICAL ADDRESS IN NAND | LUT PHYSICAL ADDRESS IN BUFFER | USER DATA NAND WRITE COMPLETION INFORMATION | LUT NAND WRITE COMPLETION INFORMATION |
|---|---|---|---|---|---|---|
| | | | | | | |
| | | | | | | |
| | | | | | | |

23B

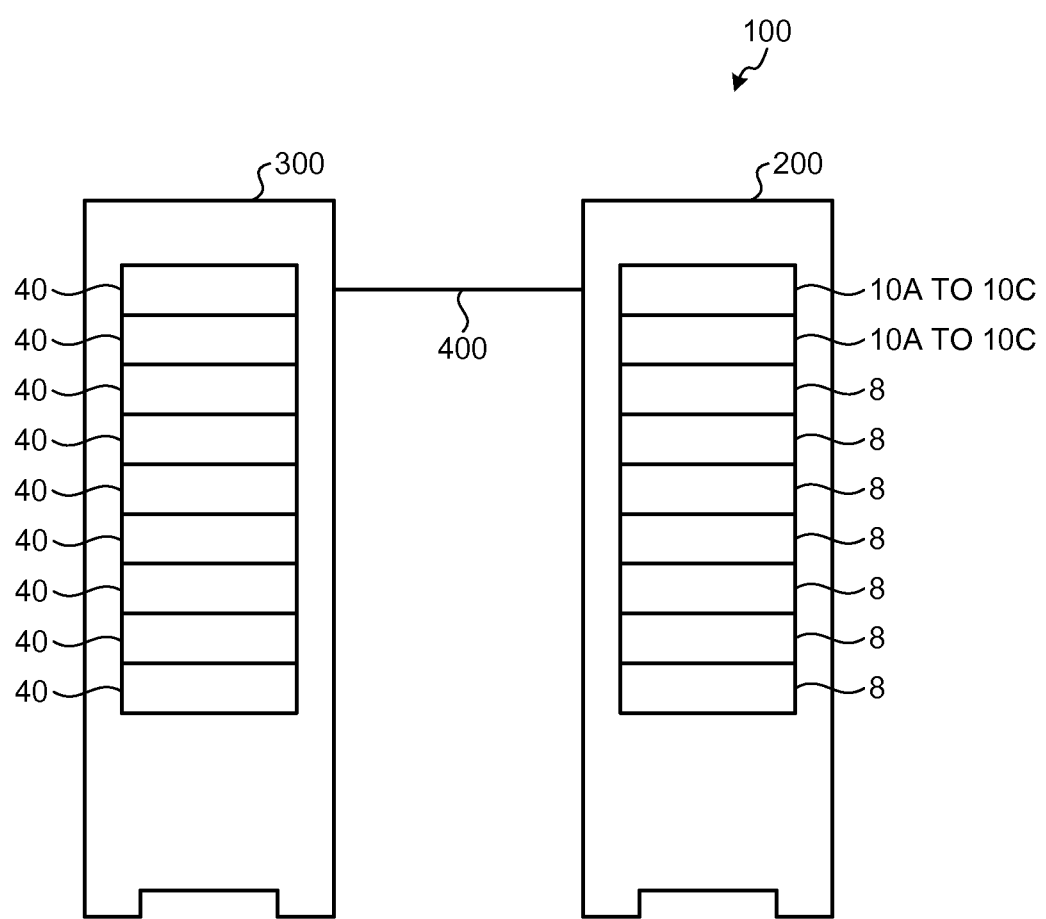

US 10,223,001 B2

MEMORY SYSTEM

CROSS-REFERENCE TO RELATED APPLICATIONS

This application is based upon and claims the benefit of priority from U.S. Provisional Application No. 62/132,389, filed on Mar. 12, 2015; the entire contents of which are incorporated herein by reference.

FIELD

Embodiments described herein relate generally to memory systems.

BACKGROUND

In general, in a memory system such as a solid state drive (SSD), user data corresponding to a write request from a host is written to a non-volatile memory. In this case, in the memory system, the user data is written to the non-volatile memory through a buffer.

In the memory system, management information for managing the storage position of the user data in the non-volatile memory is used. In a memory system according to the related art, after the writing of the user data to the non-volatile memory is completed, the management information is updated and then the buffer is deallocated. In the memory system according to the related art, the time (buffer lifetime) from the allocation of the buffer to the deallocation of the buffer increases due to the above-mentioned process. As a result, a large buffer size is required. For this reason, it is preferable to shorten the buffer lifetime to reduce the buffer size.

BRIEF DESCRIPTION OF THE DRAWINGS

FIG. 10 is a diagram illustrating the structure of a LUT dirty management table according to the second embodiment;

FIG. 13 is a diagram illustrating the structure of a LUT dirty management table according to the third embodiment;

FIG. 16 is a diagram illustrating an example of the mounting of the memory system according to the first to third embodiments.

DETAILED DESCRIPTION

In general, according to one embodiment, a memory system is provided. The memory system includes: a first memory to which user data transmitted from a host is written; and a control circuit configured to control the writing of the user data to the first memory. The control circuit includes a second memory configured to store the user data. In addition, the control circuit has first correspondence information indicating a correspondence relationship between logical identification information for logically identifying the user data and the position of the user data in the first memory. The control circuit further includes a transmission control unit configured to control the transmission of the user data from the second memory to the first memory. In addition, the control circuit includes a first correspondence information update unit configured to update the first correspondence information. The control circuit further includes a release processing unit configured to perform a release process that enables an unnecessary memory area among memory areas of the second memory to be used as a memory area for other data. In the memory system, when the control circuit receives a write command from the host, an update process, a store process, and a transmission process are performed. In the update process, the first correspondence information update unit updates the first correspondence information. In the store process, the second memory stores the user data corresponding to the write command. In the transmission process, the transmission control unit transmits the user data which is stored in the second memory to the first memory. In the memory system, when the transmission process is completed, a first write internal process in which the user data is written to the first memory is performed. In the memory system, when the update process and the transmission process are completed, the release processing unit performs the release process such that the memory area storing the user data can be used as a memory area for other data.

Hereinafter, memory systems according to embodiments will be described in detail with reference to the accompanying drawings. The invention is not limited to the embodiments.

First Embodiment

Figure 1:
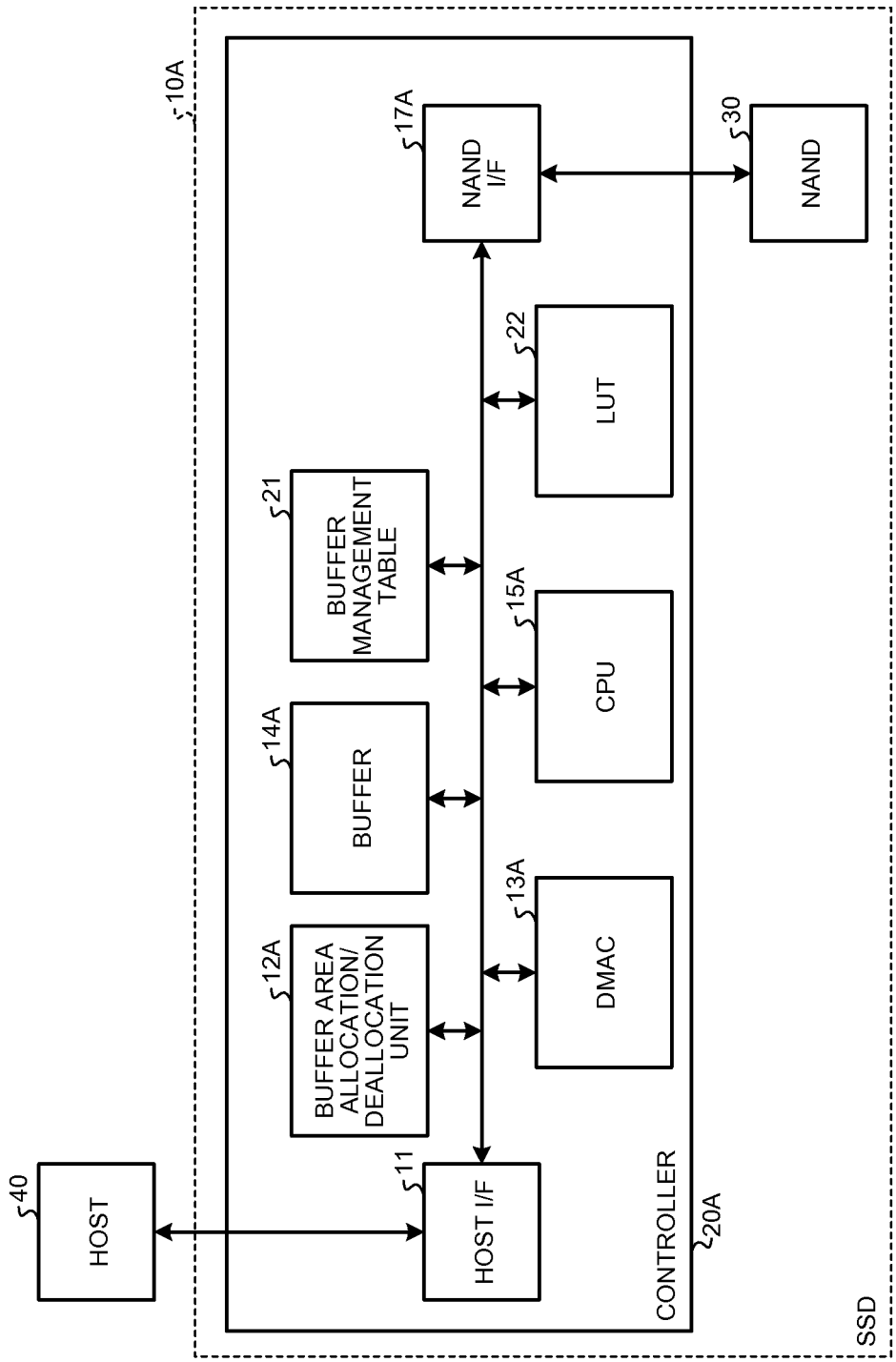
FIG. 1 is a diagram illustrating the structure of a memory system according to a first embodiment.

FIG. 1 is a diagram illustrating the structure of a memory system according to a first embodiment. In this embodiment, a case in which the memory system is a solid state drive (SSD) 10A will be described. In this embodiment, when receiving a write command from a host 40, the SSD 10A performs a process of updating management information for managing the storage position of user data in a NAND 30, which is a recordable non-volatile memory, before the writing of the user data to the NAND 30 is completed. In addition, the SSD 10A deallocates the memory area of a buffer 14A, without waiting for the completion of the writing of the user data to the NAND 30.

The SSD 10A is connected to an external device such as the host (host computer) 40. When receiving a write command from the host 40, the SSD 10A performs a process of writing the user data corresponding to the write command (data storage). The SSD 10A includes a controller (control circuit) 20A and the NAND (NAND flash memory) 30 which is an example of a non-volatile memory. The controller 20A is, for example, a semiconductor chip (system on a chip). The controller 20A controls, for example, the transmission of data between the host 40 and the NAND 30.

The controller 20A temporarily stores the user data transmitted from the host 40 and performs the DMA transmission of the temporarily stored user data to the NAND 30. In this way, the DMA-transmitted user data is written to the NAND 30.

The controller 20A includes a host I/F (Interface) 11 and a NAND I/F 17A. In addition, the controller 20A includes a buffer area allocation/deallocation unit 12A, a DMA controller (DMAC) 13A, the buffer 14A, a CPU 15A, a buffer management table 21, and a lookup table (LUT) 22. In the controller 20A, the above-mentioned components are connected to each other by, for example, a bus.

The host I/F 11 includes, for example, the function of a receiving unit which receives a write command from the host 40 and transmits the write command to the CPU 15A and a function which notifies the host 40 of the completion of command processing. In addition, the host I/F 11 has a function of receiving data (for example, write data) transmitted from the host 40 and a function of transmitting data (for example, read data) to the host 40.

The NAND I/F 17A has a function of transmitting a command to the NAND 30. In addition, the NAND I/F 17A has a function of monitoring the status of the NAND 30. The NAND I/F 17A further includes a function of transmitting data (for example, user data) stored in the controller 20A to the NAND 30 and a function of receiving data (for example, user data) from the NAND 30.

The buffer 14A is a memory that temporarily stores the user data transmitted from the host 40 when the write command is received. The data stored in the buffer 14A is written to the NAND 30 at a predetermined time. The buffer 14A is, for example, a static random access memory (SRAM), a dynamic random access memory (DRAM), or a magnetoresistive random access memory (MRAM).

The buffer area allocation/deallocation unit 12A has a function which determines the memory site (location) of data in the buffer 14A (hereinafter, referred to as a physical address in a buffer) and allocates a necessary area of the buffer 14A and a function which deallocates the buffer area having data stored therein.

The buffer area (memory region) deallocation process is a process (deallocation process) (release process) which changes an unnecessary temporary memory area such that it can be used as another data memory area (such that data can be written to the memory area). In other words, the deallocation process changes a temporary memory area in the buffer area such that it can be freely used. That is, the buffer area allocation/deallocation unit 12A has the function of a deallocation processing unit which deallocates an unnecessary temporary memory area and manages and controls the memory area such that it can store other data. For example, when data in the buffer area is deleted or invalidated (data is treated as invalid data), the buffer area is deallocated. When data is written to the buffer area, other data is not capable of being written to the buffer area. Then, when the buffer area is deallocated, other data can be written to the buffer area.

The unnecessary temporary memory area is a temporary memory area which does not cause any problem even when the user data is deleted from the buffer area or is invalidated or is overwritten with other data. In other words, the unnecessary temporary memory area is a temporary memory area from which the SSD 10A is not scheduled to read the user data. As such, since the user data is secured by the NAND 30 and the LUT 22, the unnecessary temporary memory area is unnecessary to secure the user data.

The DMAC 13A has a function of transmitting the user data received from the host 40 to the buffer 14A. In addition, the DMAC 13A has a function of transmitting the user data in the buffer 14A to the NAND 30.

The LUT 22 is an address conversion table which is used to perform address conversion from a logical address designated by the host 40 to a physical address in the NAND. In the LUT 22, the logical address and the physical address in the NAND are associated with each other. Correspondence information indicating the association is not limited to the data table. The correspondence information may be any information as long as it indicates the correspondence relationship between the logical address and the physical address in the NAND. The LUT 22 is also referred to as a flash translation layer (FTL) table. The correspondence information in the LUT 22 is stored in, for example, an SRAM, a DRAM, or an MRAM.

Figure 2:
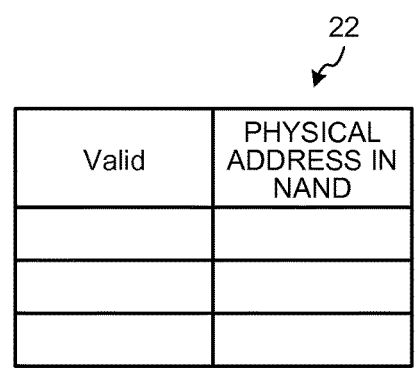
FIG. 2 is a diagram illustrating the structure of an LUT according to the first embodiment.

FIG. 2 is a diagram illustrating the structure of the LUT according to the first embodiment. FIG. 2 illustrates an example of the structure of the LUT 22. In the LUT 22, for example, an entry is provided for each logical address or each unit of management of the user data in the SSD 10A. In this embodiment, a case in which an entry is provided for each logical address in the LUT 22 will be described. In each entry, "Valid" is associated with the physical address in the NAND.

As illustrated in FIG. 2, when no logical address is registered in the LUT 22, an entry number and a logical address are associated with each other. For example, an N-th (N is a natural number) logical address is registered in entry number N. Therefore, the SSD 10A can search for the entry number corresponding to the logical address and search for the physical address in the NAND corresponding to the entry number.

The "Valid" indicates the validity of each entry in the LUT 22. In an initial state, information indicating "invalid" is registered in the "Valid" field. The physical address in the NAND is the physical address of the user data in the NAND 30. In the initial state, an invalid value is registered in the physical-address-in-NAND field.

FIG. 2 illustrates an example of the structure of the LUT 22 when the "Valid" is provided for each logical address. However, the LUT 22 may have any structure as long as validity can be identified. For example, a magic number may be provided at the field of the physical address in the NAND.

The buffer management table 21 is a table which stores correspondence information in which a logical address corresponding to the user data is associated with a physical address in the buffer. The correspondence information is not limited to the data table. The correspondence information may be any information as long as it indicates the correspondence relationship between the logical address and the physical address in the buffer. The logical address of the user data is the address designated by the host 40.

In this embodiment, in the buffer management table 21, information indicating whether the update of the LUT 22 has been completed, information indicating whether a user data buffering process has been completed, and information indicating whether the DMA transmission of the user data to the NAND 30 has been completed are associated with the above-mentioned correspondence information. The completion of the process means a state in which all of the processes have ended and the end of the processes has been confirmed. The completion time of the processes may be the time when the end of all processes has been confirmed within a predetermined period of time.

Figure 3:
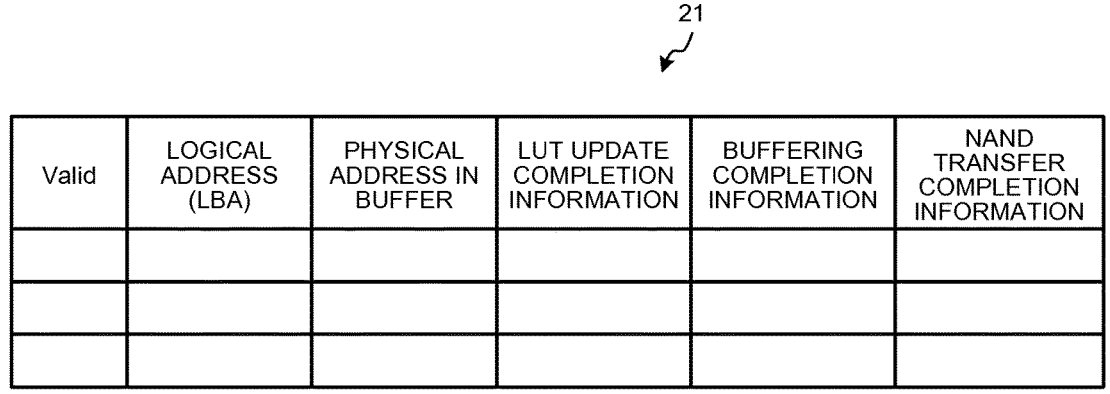
FIG. 3 is a diagram illustrating the structure of a buffer management table according to the first embodiment.

FIG. 3 is a diagram illustrating the structure of the buffer management table according to the first embodiment. FIG. 3 illustrates an example of the structure of the buffer management table 21. In the buffer management table 21, for example, an entry is provided for each logical address or each unit of management of the user data in the SSD 10A. In this embodiment, a case in which an entry is provided for each logical address in the buffer management table 21 will be described. In each entry, Valid, a logical address (LBA), a physical address in a buffer, LUT update completion information, buffering completion information, and NAND transmission completion information are associated with each other.

The "Valid" indicates the validity of each entry in the buffer management table 21. In the initial state, information indicating "invalid" is registered in the "Valid" field. The logical address indicates the logical address of the user data designated by the write command from the host 40. In the initial state, an invalid value is registered in the logical address field. The physical address in the buffer indicates the physical address (location of the user data) of the user data in the buffer 14A. In the initial state, an invalid value is registered in the physical address field. The LUT update completion information is information indicating whether the update of the LUT 22 has been completed. In the initial state, information indicating "non-completed" is registered in the LUT update completion information field. The buffering completion information is information indicating whether the DMA transmission of the user data from the host 40 to the buffer 14A has been completed. In the initial state, information indicating "non-completed" is registered in the buffering completion information field. The NAND transmission completion information is information indicating whether the DMA transmission of the user data to the NAND 30 has been completed. In the initial state, information indicating "non-completed" is registered in the NAND transmission completion information field.

The CPU 15A has the function of a first physical address determination unit which determines a physical address (hereinafter, referred to as a physical address in a NAND) indicating the location of the user data in the NAND 30 after the write command is received from the host 40. The physical address in the NAND which indicates the location of the user data in the NAND 30 is an identifier which can uniquely identify the location of the user data in the NAND 30. The location of the user data in the NAND 30 indicates a read/write position when the user data is read and written in the NAND 30. The physical address in the NAND is, for example, a value (address) indicating the position of the area in which the user data is stored. In this embodiment, the CPU 15A allocates the physical address in the NAND to each logical address which is designated by the write command received from the host 40.

In addition, the CPU 15A has a function of acquiring an invalid entry of the buffer management table 21, that is, an entry in which information indicating "invalid" is registered in the "Valid" field. If necessary, the CPU 15A has a function of updating the "Valid", the logical address, the physical address in the buffer, the LUT update completion information, the buffering completion information, and the NAND transmission completion information in each entry of the buffer management table 21.

The CPU 15A further has a function of updating the physical address in the NAND in the LUT 22 (LUT update). In addition, the CPU 15A has a function which determines whether a predetermined condition is satisfied and determines the time when the user data starts to be transmitted from the buffer 14A to the NAND 30. Here, the predetermined condition may be any condition. For example, the predetermined condition is that the amount of user data in the buffer 14A is equal to or greater than a predetermined value, that a predetermined period of time has elapsed from the initial buffering of the user data after the start of the previous DMA transmission of the user data to the NAND 30, or that a specific command is received from the host 40. In this embodiment, a case in which the predetermined condition is that the amount of user data buffered is equal to or greater than a predetermined value.

The CPU 15A further has a function which issues a specific command to the NAND 30 and instructs the NAND 30 to perform a desired process. For example, the CPU 15A issues instruction to the NAND 30 to perform a NAND write internal process which is a process of writing the user data. The NAND write internal process is also referred to as a program.

The NAND 30 stores the user data designated by the host 40 and also stores management information such as the LUT 22. In this embodiment, when an instruction to perform the NAND write internal process is issued from an external device such as the CPU 15A, the NAND 30 performs the NAND write internal process.

Figure 4:
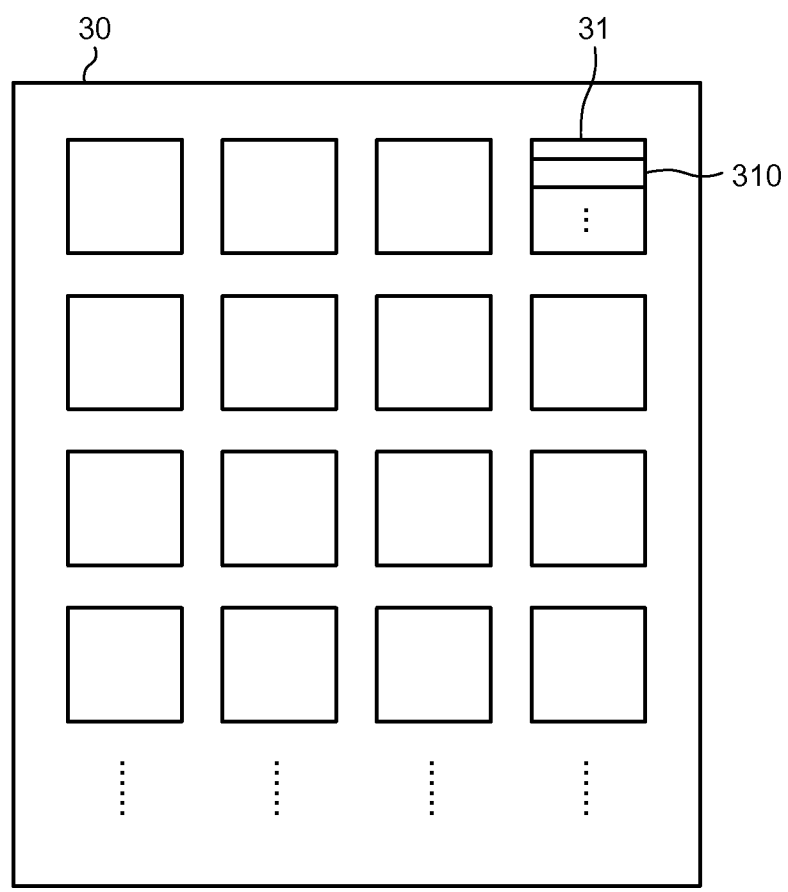
FIG. 4 is a diagram illustrating the structure of a NAND according to the first embodiment.

FIG. 4 is a diagram illustrating the structure of the NAND according to the first embodiment. FIG. 4 illustrates an example of the structure of the NAND 30. The NAND 30 includes a plurality of physical blocks 31. Each physical block 31 includes a plurality of pages 310. Each page 310 can store, for example, 16-KB data.

When an external module reads data from the NAND or writes data to the NAND, the external module accesses the NAND in the unit of page. For example, when the controller 20A, which will be described below, writes user data to the NAND 30 in which the capacity of one page is 16 KB, 16-KB user data is stored in the buffer 14A (which will be described below) in the controller 20A and is then written to the NAND 30.

When the external module reads desired data from the NAND 30 or writes data to the NAND 30, the external module designates the storage position of the data in the NAND 30 (the physical address in the NAND).

The external module has the restriction that it is not capable of overwriting data in the NAND 30. When the external module writes data at a given physical address in the NAND, designated data is written to the target page (written state). It is difficult for the external module to write data to the same page. When the external module writes data to the same page, it is necessary to perform an erase process before the data is written. The page subjected to the erase process does not have any data written therein (unwritten state) and becomes an unwritten area. The external module can write data to the page.

The erase process is performed for each block in the NAND 30. The NAND 30 is not capable of performing the erase process for only one page. In addition, the NAND 30 is not capable of performing the erase process for only a portion of one page. In a case in which the NAND 30 performs the erase process for an arbitrary block to change the block to the unwritten state, even though the external module performs a read process for an arbitrary page included in the block, the external module is not capable of acquiring the data which has been stored in the page in the written state. For this reason, when writing data to the page in the written state, the external module needs to perform the erase process for the entire block including the page to discard all data in the block. Therefore, data which the user does not want to erase needs to be read out and be buffered or stored in other block before the erase process is performed.

In some cases, a long processing time or a large amount of buffering is required to save the valid data before the erase process, which results in performance degradation of the SSD. Therefore, in general, user data is additionally written to the NAND 30 and information about the correspondence between the logical address and the physical address in the NAND is registered using the LUT 22.

When issuing a read command or a write command to the SSD 10A, the host 40 designates a logical block address (LBA) as the logical address. The LBA is a logical address which is a serial number starting from 0 and is given to a sector.

The user data which has been transmitted from the host 40 and then received by the SSD 10A is stored in the buffer 14A in the unit of logical block managed by the host 40. Then, the user data in the buffer 14A is written in a predetermined size to the NAND 30.

Figure 5:
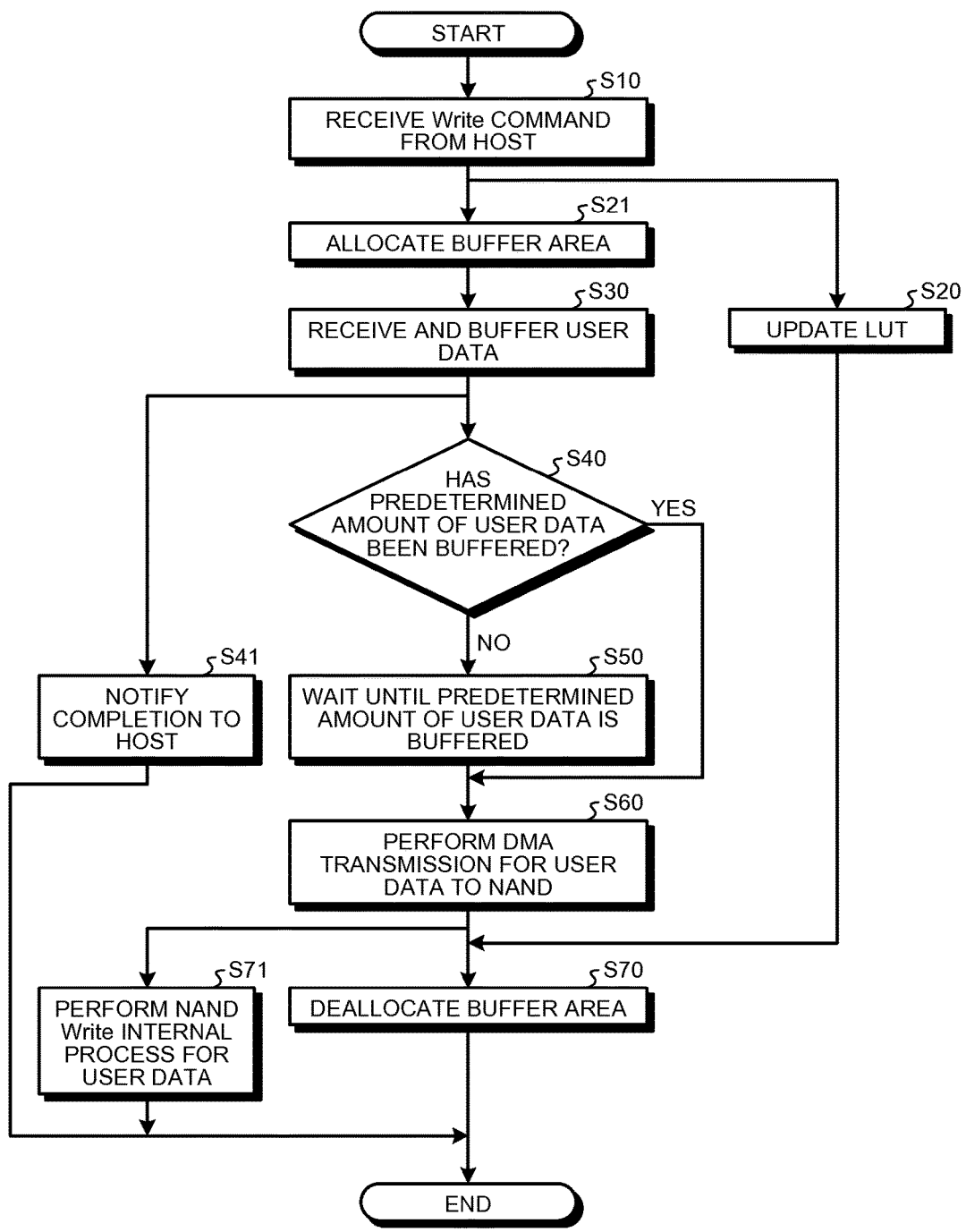
FIG. 5 is a diagram illustrating the procedure of the operation of the memory system according to the first embodiment.

FIG. 5 is a diagram illustrating the procedure of the operation of the memory system according to the first embodiment. In FIG. 5, the procedure of an operation when the SSD 10A writes the user data to the NAND 30 through the buffer 14A will be described.

When a write command is transmitted from the host 40, the host I/F 11 of the SSD 10A receives the write command (step S10) and transmits the write command to the CPU 15A. When receiving the write command from the host I/F 11, the CPU 15A acquires an invalid entry of the buffer management table 21. Specifically, the CPU 15A acquires the necessary number of entries in which information indicating "invalid" is registered in the "Valid" field of the buffer management table 21. The CPU 15A registers information indicating "valid" in the "Valid" field, the logical address designated by the write command in the "logical address" field, information indicating "non-completed" in the LUT update completion information field, information indicating "non-completed" in the buffering completion information field, and information indicating "non-completed" in the NAND transmission completion information field in the acquired entry. The CPU 15A may acquire the invalid entry of the buffer management table 21 in advance before the write command is received from the host 40.

Then, the SSD 10A performs a process of buffering the user data corresponding to the write command and a process of performing the DMA transmission of the user data to the NAND 30 (steps S21, S30, S40, S50, and S60), a process of updating the LUT 22 (step S20), and a process of notifying the host 40 of the completion of a writing process (step S41) in parallel.

In this embodiment, the parallel processing means that a plurality of processes are performed at the same time. Therefore, when a first process and a second process are performed in parallel, at least a portion of the first process and at least a portion of the second process are performed at the same time. When the processes are performed at the same time, one process is performed regardless of the progress of the other processes. In addition, when the parallel processing is performed, some processes are not necessarily performed at the same time. For example, after one process is completed, another process may start. Therefore, the process of updating the LUT 22 may be performed before step S21 or may be performed between steps S21 to S60. In addition, the process of updating the LUT 22 may be performed after step S60.

For performing the process of updating the LUT 22, first, the CPU 15A determines the physical address in the NAND when the user data corresponding to the write command is actually written to the NAND 30. The CPU 15A receives the write command from the host I/F 11 and updates the LUT 22. In this case, the CPU 15A updates the LUT 22 in which the logical address designated by the write command from the host 40 is associated with the physical address in the NAND corresponding to the logical address. When the process of updating the LUT 22 is completed, the CPU 15A registers information indicating "completed" in the LUT update completion information field in the entry of the buffer management table 21 acquired immediately after the CPU 15A receives the write command.

When the process of buffering the user data is performed, the CPU 15A requests the buffer area allocation/deallocation unit 12A to allocate a buffer area required to temporarily store the user data. The buffer area allocation/deallocation unit 12A receives the request, allocates a buffer area (step S21), and transmits the physical address in the buffer to the CPU 15A. When receiving a response from the buffer area allocation/deallocation unit 12A, the CPU 15A issues a transmission request to the DMAC 13A such that the DMAC 13A performs the DMA transmission of the user data received from the host 40 to the physical address in the allocated buffer area (step S30). Then, the buffer 14A stores the user data received from the host 40 in the buffer area. When the process of performing the DMA transmission of the user data is completed, the DMAC 13A notifies the CPU 15A of the completion of the DMA transmission process.

When CPU 15A receives the notice indicating the completion of the DMA transmission from the DMAC 13A, the CPU 15A notifies the host 40 of the completion of the write process through the host I/F 11 (step S41).

At the same time, the CPU 15A registers correspondence information of the physical address in the buffer which is acquired from the buffer area allocation/deallocation unit 12A in the entry of the buffer management table 21 and registers information indicating "completed" in the buffering completion information field.

When the process of registering the information in the buffer management table 21 is completed, the CPU 15A checks whether a predetermined amount of user data has been buffered in the buffer 14A (step S40). When a predetermined amount of user data has not been buffered in the buffer 14A (step S40, No), the CPU 15A waits until a predetermined amount of user data is buffered in the buffer 14A (step S50).

On the other hand, when a predetermined amount of user data has been buffered in the buffer 14A (step S40, Yes), the CPU 15A issues a transmission request to the DMAC 13A such that the DMAC 13A performs the DMA transmission of the user data in the buffer 14A, which is managed by the buffer management table 21, to the NAND 30. When receiving the transmission request from the CPU 15A, the DMAC 13A performs the DMA transmission of the user data to the NAND 30 through the NAND I/F 17A (step S60). When the process of performing the DMA transmission of the user data is completed, the DMAC 13A notifies the CPU 15A of the completion of the DMA transmission. When receiving a transmission completion notice from the DMAC 13A, the CPU 15A registers information indicating "completed" in the NAND transmission completion information field of the entry corresponding to the user data, which has been DMA-transmitted to the NAND 30, in the buffer management table 21.

At the same time, the CPU 15A issues a command to perform the NAND write internal process to the NAND 30 through the NAND I/F 17A. When receiving the command from the CPU 15A, the NAND 30 performs the NAND write internal process. As a result, the user data is written to the NAND 30 (step S71).

In this embodiment, the CPU 15A determines the deallocation time of the buffer area on the basis of the LUT update completion information and the NAND transmission completion information in the buffer management table 21. Specifically, when information indicating "completed" is registered in the LUT update completion information field and information indicating "completed" is registered in the NAND transmission completion information field in the buffer management table 21, the CPU 15A checks both the LUT update completion information and the NAND transmission completion information in the updated entry. When the LUT update completion information indicates "completed" and the NAND transmission completion information indicates "completed", the CPU 15A determines that it is time to deallocate the buffer area.

When it is determined that it is time to deallocate the buffer area, the CPU 15A invalidates the content registered in the entry in the buffer management table 21. Specifically, the CPU 15A registers information indicating "invalid" in the "Valid" field of the entry which corresponds to the user data in the deallocated buffer area in the buffer management table 21.

The CPU 15A designates the buffer physical address in the buffer area and issues a request to deallocate the buffer area to the buffer area allocation/deallocation unit 12A. When receiving the buffer area deallocation request from the CPU 15A, the buffer area allocation/deallocation unit 12A deallocates the buffer area (step S70).

In the SSD 10A, the process in step S70 and the process in step S71 are performed in parallel. In other words, the process of deallocating the buffer area and the NAND write internal process for the user data are performed in parallel. In addition, the process in step S70 and the process in step S71 may be performed at the same time or one of the two processes may be performed first.

Similarly, the process in step S41 and the process in steps S40 to S70 and step S71 are performed in parallel. In other words, when the user data received from the host 40 is transmitted to the buffer 14A, a notice indicating the completion of the write command is transmitted to the host 40, regardless of the writing of the user data to the NAND 30 or the deallocation of the buffer area.

As such, in this embodiment, when receiving a write command from the host 40, the SSD 10A updates the LUT 22 before the NAND write internal process is completed in the NAND 30. In addition, when the DMA transmission of the user data to the NAND 30 is performed and the LUT 22 is updated, the SSD 10A deallocates the buffer area, regardless of the NAND write internal process in the NAND 30.

Next, an SSD 10X (not illustrated) which performs the NAND write internal process for the user data (a process of writing the user data to the NAND 30) and then updates the LUT 22 will be described.

Figure 6:
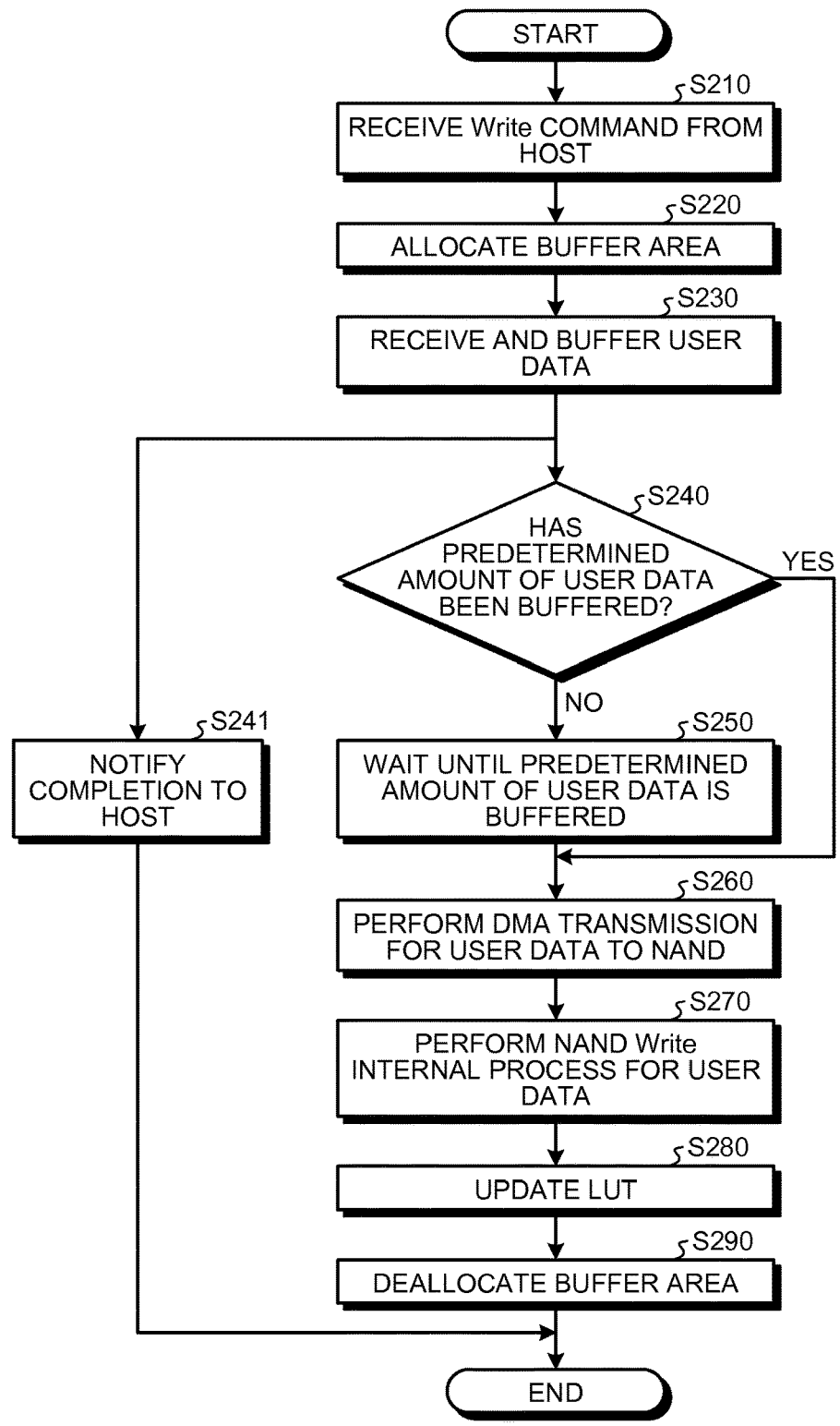
FIG. 6 is a diagram illustrating the procedure of the operation of the memory system which performs an LUT update process after a NAND write internal process for user data is performed.

FIG. 6 is a diagram illustrating the procedure of the operation of a memory system which performs an LUT update process after the NAND write internal process is performed for the user data. FIG. 6 illustrates the procedure of the operation of the SSD 10X writing the user data to the NAND 30 through the buffer 14A.

When receiving a write command from the host (step S210), the SSD 10X allocates a buffer area (step S220). Then, the SSD 10X receives user data and buffers the user data (step S230).

When the buffer receives the user data from the host, the SSD 10X notifies the host of the completion of the write process (step S241). In addition, the SSD 10X checks whether a predetermined amount of user data has been buffered (step S240). When a predetermined amount of user data has not been buffered (step S240, No), the SSD 10X waits until a predetermined amount of user data is buffered (step S250). On the other hand, when a predetermined amount of user data has been buffered (step S240, Yes), the SSD 10X determines the physical address of the user data in the NAND for each logical address and performs the DMA transmission of the user data in the buffer to the NAND (step S260).

When the DMA transmission of the user data to the NAND is performed, the SSD 10X performs the NAND write internal process for the user data to write the user data to the NAND (step S270).

After NAND 30 completed the NAND write internal process, the SSD 10X performs the LUT update process on the basis of the physical address in the NAND which is determined before the DMA transmission of the user data to the NAND (step S280). Then, the SSD 10X deallocates the buffer area which has been allocated in order to store the user data (step S290).

As such, in the SSD 10X, the time required for the NAND write internal process is included in the lifetime of the buffer. As a result, in the SSD 10X, the lifetime of the buffer increases and the size of the buffer increases.

On the other hand, when the DMA transmission of the user data to the NAND 30 is performed and the LUT 22 is updated, the SSD 10A deallocates the buffer area, regardless of the NAND write internal process in the NAND 30. Therefore, in the SSD 10A, the NAND write internal process is not included in the lifetime of the buffer. Therefore, in the SSD 10A, the lifetime of the buffer is shorter than that in the SSD 10X. As a result, in the SSD 10A, it is possible to reduce the buffer size, as compared to the SSD 10X.

In the SSD 10X, it is necessary to determine whether the content of update is valid or invalid before the LUT is updated, depending on the design of a controller. For example, the following case is considered: a write command which designates the same logical address is received a plurality of times from the host and user data corresponding to the same logical address is present in the buffer. In the SSD 10X, after the NAND write internal process is completed, the LUT update process is performed for the user data in the buffer. At that time, it is necessary to determine the logical address of each user data item and the physical address of each user data item in the NAND are the latest addresses.

In the SSD 10A, since the LUT 22 is updated in the order in which the write command is received from the host 40, this determination process is not needed, which results in a simple structure.

In the SSD 10X, when the buffer area is deallocated before the NAND write internal process for the user data is completed, an operation error is likely to occur at the time a read command is received from the host. This is because the update of the LUT in the SSD 10X is performed after the NAND write internal process for the user data is completed.

When receiving a read command from the host 40, the SSD 10A reads the user data corresponding to the logical address designated by the read command from the NAND 30 and transmits the user data to the host 40. Alternatively, the SSD 10A reads the user data from the buffer 14A and transmits the user data to the host 40. The operation switches depending on whether the latest user data corresponding to the logical address designated by the read command is present in the buffer 14A. These processes hold for the SSD 10X.

Figure 7:
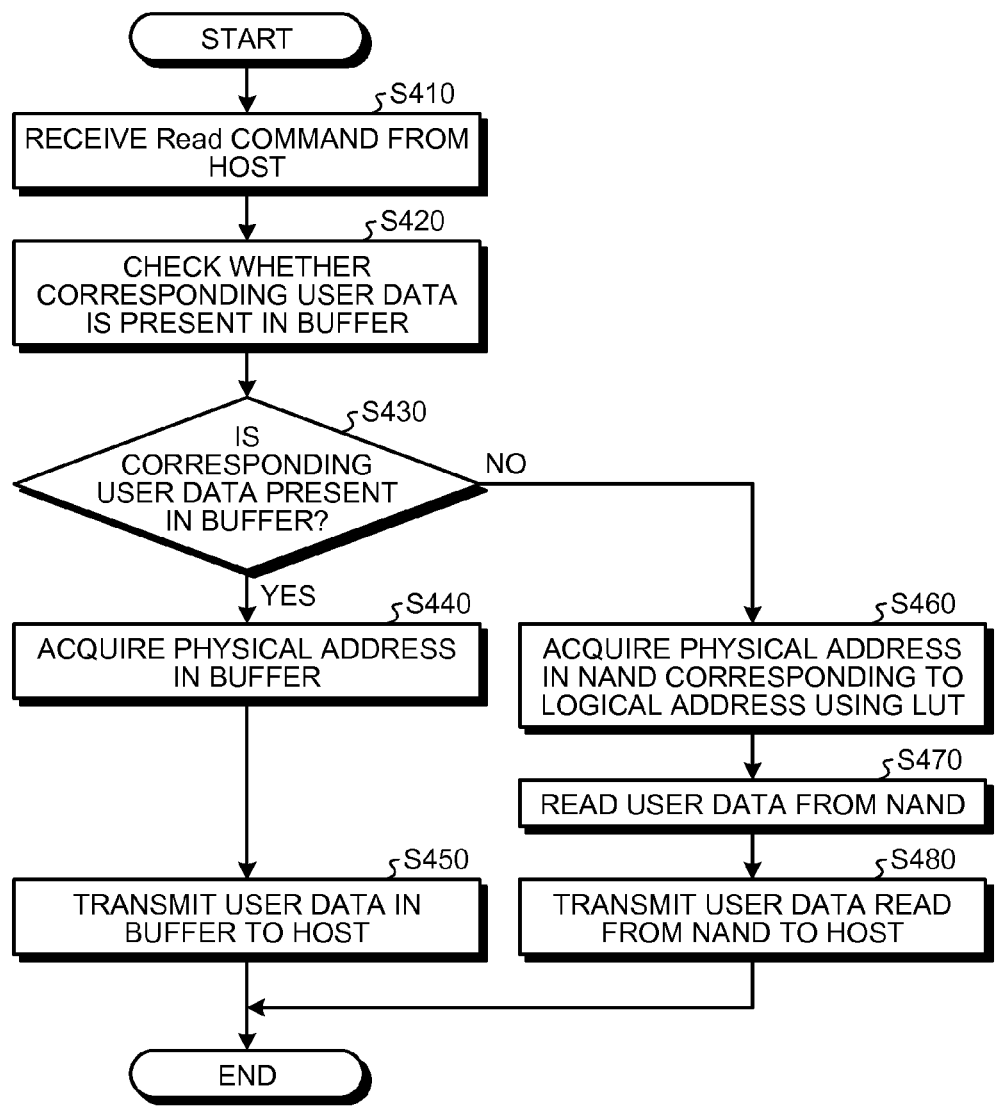
FIG. 7 is a diagram illustrating the procedure of the operation of the memory system when an SSD receives a read command from the host.

FIG. 7 is a diagram illustrating the procedure of the operation of the SSD when a read command is received from the host. Next, the procedure of the operation of the SSD 10A when a read command is received from the host 40 will be described.

The SSD 10A receives a read command from the host 40 (step S410) and checks whether the user data corresponding to the read command is present in the buffer 14A (step S420). Specifically, the SSD 10A investigates each entry of the buffer management table 21 and checks whether there is an entry in which information indicating "valid" is registered in the "Valid" field and the logical address is the same as the logical address designated by the read command.

When the user data corresponding to the read command is present in the buffer 14A (step S430, Yes), the SSD 10A acquires the physical address in the buffer from the buffer management table 21 (step S440) and transmits the user data from the buffer 14A to the host 40 on the basis of the physical address in the buffer (step S450).

When the user data corresponding to the read command is absent in the buffer 14A (step S430, No), the SSD 10A acquires the physical address in the NAND which corresponds to the logical address designated by the read command, using the LUT 22 (step S460). The SSD 10A reads the user data from the NAND 30 on the basis of the physical address in the NAND (step S470) and transmits the user data to the host 40 (step S480). In the SSD 10X, similarly to the SSD 10A, the process illustrated in FIG. 7 (step S410 to S480) is performed.

When the SSD 10X deallocates the buffer area before the NAND write internal process for the user data is completed, there is a period for which information about the correspondence between the logical address in the LUT and the physical address in the NAND is old, from the deallocation of the buffer to the completion of the update of the LUT. When a command to read the user data stored in the deallocated buffer area is received from the host for the period, the user data which is not the latest (user data before one generation or a few generations) is transmitted to the host, which results in an operation error. Specifically, since the buffer area storing the user data corresponding to the logical address designated by the read command has been deallocated (step S430 in FIG. 7, No), the user data is read from the NAND. At that time, since the LUT has not been updated, the physical address in the NAND which corresponds to the logical address in the LUT does not indicate the position where the latest user data is stored in the NAND, but indicates the position where the user data which is not the latest is stored in the NAND. The SSD 10X acquires the old physical address in the NAND, reads the user data from the NAND, and transmits the user data to the host, which results in an operation error.

However, in the SSD 10A, there is no period for which information about the correspondence between the logical address in the LUT 22 and the physical address in the NAND is old from the deallocation of the buffer to the completion of the update of the LUT. In other words, when the buffer area storing the user data corresponding to the logical address designated by the read command has been deallocated (released), the user data is read from the NAND 30, similarly to the SSD 10X. At that time, since the update of the LUT 22 has been completed, it is possible to acquire the physical address of the latest user data in the NAND, using the correspondence information of the LUT 22, to read the latest user data from the NAND 30, and to transmit the user data to the host 40. When the NAND 30 performs the NAND write internal process at the time of the reading of the user from the NAND 30, the SSD 10A needs to wait until this process is completed.

Until the NAND write internal process is performed, there is a period for which, for example, the physical address of an unwritten area in the NAND 30 is registered at the physical address in the NAND in the LUT 22. However, for this period, since the user data is temporarily stored in the buffer 14A, the SSD 10A does not read the latest user data from the NAND 30, but reads the latest user data from the buffer 14A. Then, the SSD 10A can transmit the user data to the host 40.

During garbage collection (which is also referred to as compaction), the SSD 10A may perform, for example, the process of updating the LUT 22, the buffer area deallocation process, and the NAND write internal process. The garbage collection means a process of collecting, for example, invalid user data in the blocks of the NAND 30.

When a command to write data to the same logical address is received from the host, the user data before one or more generations is managed as invalid data. In other words, when the write command is continuously received from the host, the amount of invalid user data in the block of the NAND increases.

Basically, the NAND has the restriction that data is not capable of being overwritten to the same physical address in the NAND. During a write process, the area to which data will be written needs to be in an unwritten state. For example, when user data is continuously written to the NAND, the SSD 10A is not capable of writing the user data since the capacity of the NAND provided in the SSD 10A is limited. Therefore, the SSD 10A needs to perform an erase process at a predetermined time to acquire unwritten-state block.

The NAND erase process is performed in block unit. Therefore, SSD 10A needs to check whether the block to be subjected to the erase process includes valid data. When the erase process is performed for the block including valid data, the valid data is discarded. When a command to read the valid data which has been erased is received from the host, an operation error occurs in the SSD.

A garbage collection process is needed in order to perform the erase process for the block of the NAND including valid data. In the garbage collection, before the erase process is performed for the block of the NAND 30, all of the valid data included in the block to be subjected to the erase process is read and written to another NAND block. The invalid data in the block to be subjected to the erase process is erased. Therefore, even when the erase process is performed for the block, the valid data is held in other block. In addition, the block in the unwritten state is allocated due to the erase process and the controller 20A can keep writing data to the NAND 30.

Figure 8:
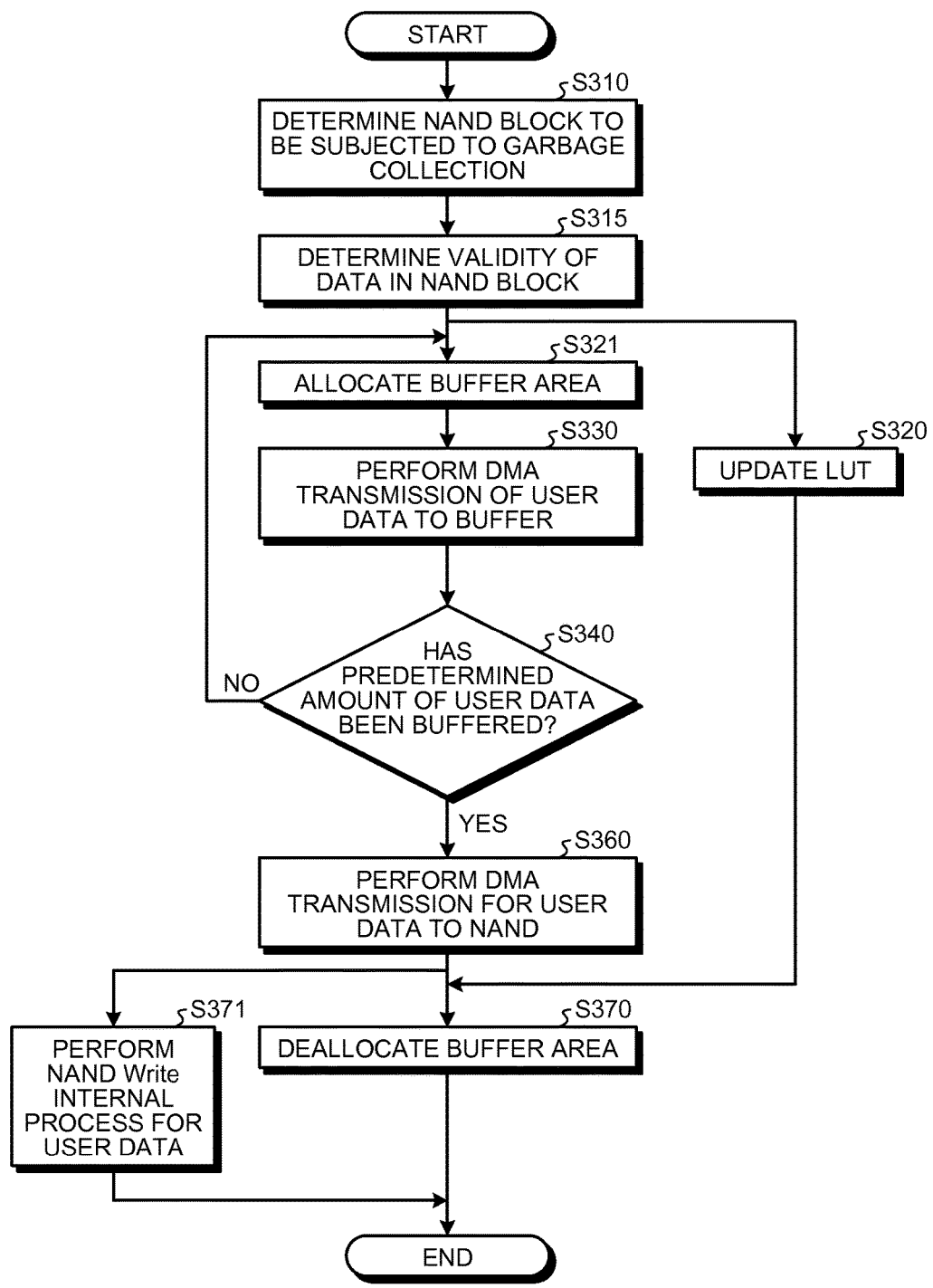
FIG. 8 is a diagram illustrating the procedure of an operation when the memory system according to the first embodiment performs garbage collection.

FIG. 8 is a diagram illustrating an example of the procedure of an operation when the memory system according to the first embodiment performs the garbage collection. When the SSD 10A performs the garbage collection, for example, a process of updating the LUT 22, a buffer area deallocation process, and a NAND write internal process are performed by the same procedure described with reference to FIG. 5. Hereinafter, the description of the same process described with reference to FIG. 5 will not be repeated.

After a predetermined condition is established, for example, when the number of blocks in the unwritten state in the NAND is reduced, the CPU 15A determines a NAND block to be subjected to the garbage collection (step S310) and determines the validity of each user data item included in the block (step S315). In addition, the CPU 15A acquires a necessary number of invalid entries of the buffer management table 21. The CPU 15A registers information indicating "valid" in the "Valid" field, the logical address of valid user data stored in the NAND 30 in the logical address field, information indicating "non-completed" in the LUT update completion information field, information indicating "non-completed" in the buffering completion information field, and information indicating "non-completed" in the NAND transmission completion information field in the acquired entry. The invalid entry of the buffer management table 21 may be acquired before the block to be subjected to the garbage collection is determined.

Then, the SSD 10A performs a process of buffering the user data included in the block to be subjected to the garbage collection in the NAND 30 (steps S321, S330, S340, and S360) and a process of updating the LUT 22 (step S320) in parallel.

When the process of buffering the user data is performed, the CPU 15A requests the buffer area allocation/deallocation unit 12A to allocate a buffer area required to temporarily store the user data. When receiving the request, the buffer area allocation/deallocation unit 12A allocates a buffer area (step S321) and transmits a physical address in the buffer to the CPU 15A. When receiving a response from the buffer area allocation/deallocation unit 12A, the CPU 15A reads valid user data from the NAND 30. Specifically, the CPU 15A issues a command to perform a NAND read internal process, which is a user data reading process, to the NAND 30 through the NAND I/F 17A. When receiving the command from the CPU 15A, the NAND 30 performs the NAND read internal process. The NAND I/F 17A monitors the NAND 30 which is performing the NAND read internal process. When the NAND read internal process is completed, the NAND I/F 17A notifies the completion of the NAND read internal process to the CPU 15A. When receiving the completion notice, the CPU 15A issues a transmission request to the DMAC 13A so as to transmit user data from the NAND 30 to the allocated area of the buffer 14A. When receiving the transmission request from the CPU 15A, the DMAC 13A performs the DMA transmission of the user data from the NAND 30 to the buffer 14A through the NAND I/F 17A (step S330). Then, the buffer 14A stores the user data transmitted from the NAND 30. When the DMA transmission of the user data is completed, the DMAC 13A notifies the completion of the DMA transmission to the CPU 15A. When receiving the notice, the CPU 15A registers the transmission destination address of the user data in the physical-address-in-buffer field and information indicating "completed" in the buffering completion information field in the corresponding entry of the buffer management table 21.

The CPU 15A determines whether a predetermined amount of user data has been buffered in the buffer 14A (step S340). When a predetermined amount of user data has not been buffered in the buffer 14A (step S340, No), the CPU 15A performs a process of buffering the user data from the same block to the buffer 14A according to the same procedure as described above (steps S321 and S330).

On the other hand, when a predetermined amount of user data has been buffered in the buffer 14A (step S340, Yes), the CPU 15A issues a transmission request to the DMAC 13A so as to perform the DMA transmission of the user data in the buffer 14A, which is managed by the buffer management table 21, to the NAND 30. When receiving the transmission request from the CPU 15A, the DMAC 13A performs the DMA transmission of the user data to the NAND 30 through the NAND I/F 17A (step S360).

Then, when it is checked that both the DMA transmission of the user data to the NAND 30 and the update of the LUT 22 have been completed on the basis of the buffer management table 21, the buffer area having the user data stored therein is deallocated (step S370).

When the DMA transmission of the user data to the NAND 30 is completed, the CPU 15A issues a command to perform the NAND write internal process to the NAND 30 through the NAND I/F 17A. When receiving the command from the CPU 15A, the NAND 30 performs the NAND write internal process. As a result, the user data is written to the NAND 30 (step S371). In the SSD 10A, the process in step S370 and the process in step S371 are performed in parallel.

In this embodiment, the case in which the process of updating the LUT 22 is performed when the write command is received from the host 40 has been described. The update of the LUT 22 may be reserved. In this case, for example, an update reservation queue is arranged in the SSD 10A. When the SSD 10A receives a write command from the host 40, the CPU 15A stores a reservation for the update of the LUT 22 in the update reservation queue.

Then, when both the DMA transmission of the user data to the NAND 30 and the reservation for the update of the LUT 22 are completed, the CPU 15A updates the LUT 22 on the basis of the content of the update reservation in the update reservation queue. The reservation for the update of the LUT 22 is a process which stores, for example, the content of the update of the LUT 22 or a log corresponding to the content of the update in a memory, such as an update reservation queue, and reflects the content or the log in the LUT 22.

As such, in the SSD 10A, when the controller 20A receives a write command from the host 40, a process of updating the LUT 22, a temporary store process of temporarily storing the user data corresponding to the write command in the buffer 14A, and a transmission process of performing the DMA transmission of the user data, which is temporarily stored in the NAND 30, to the NAND 30 are performed. Then, in the SSD 10A, when the DMA transmission process is completed, the NAND write internal process for the user data is performed. In the SSD 10A, when the update process and the DMA transmission process are completed, a deallocation process of deallocating the buffer area is performed.

Therefore, according to the first embodiment, it is possible to deallocate the buffer area, without waiting for the NAND write internal process for the user data. As a result, the lifetime of the buffer 14A is shortened and it is possible to reduce the buffer size of the controller 20A. In addition, since the LUT 22 is updated when the write command is received from the host 40, it is not necessary to determine whether the correspondence information between the logical address and the physical address in the NAND is the latest and it is possible to simplify the structure of the controller 20A. Therefore, it is possible to reduce the power consumption of the entire SSD and to reduce the circuit size of the controller 20A.

When the buffer size is large and an SRAM is provided as the buffer, the chip area of the controller increases. Therefore, the structure in which the SRAM is mounted as the buffer is impractical in terms of both power consumption and costs. In this situation, a DRAM or an MRAM needs to be mounted as the buffer. However, it is necessary to arrange a lot of DRAM chips or MRAM chips in parallel in order to achieve a high-performance SSD and increase the bandwidth of the buffer, which results in an increase in the manufacturing costs of the SSD. Since the buffer size is reduced by the structure according to the embodiment, an opportunity for mounting SRAM as the buffer increases. Therefore, it is not necessary to mount a plurality of DRAMs or MRAMs and it is possible to suppress an increase in manufacturing costs.

Second Embodiment

Next, a second embodiment will be described with reference to FIGS. 9 to 11. In the second embodiment, an SSD is used which is not provided with a battery or a capacitor used to reliably non-volatilizes, for example, user data or management information even when illegal power shutdown occurs. The SSD according to the second embodiment non-volatilizes the LUT 22 after non-volatilizing user data. Therefore, even when illegal power shutdown occurs, it is possible to access the user data at the time of the next start-up. In the second embodiment, the SSD reduces the risk that all of the user data written from the host is not accessed. Specifically, according to the SSD of the second embodiment, it is possible to access the latest user data or the user data which is not the latest, for example, the user data before one or more generations, according to the conditions of the SSD.

Figure 9:
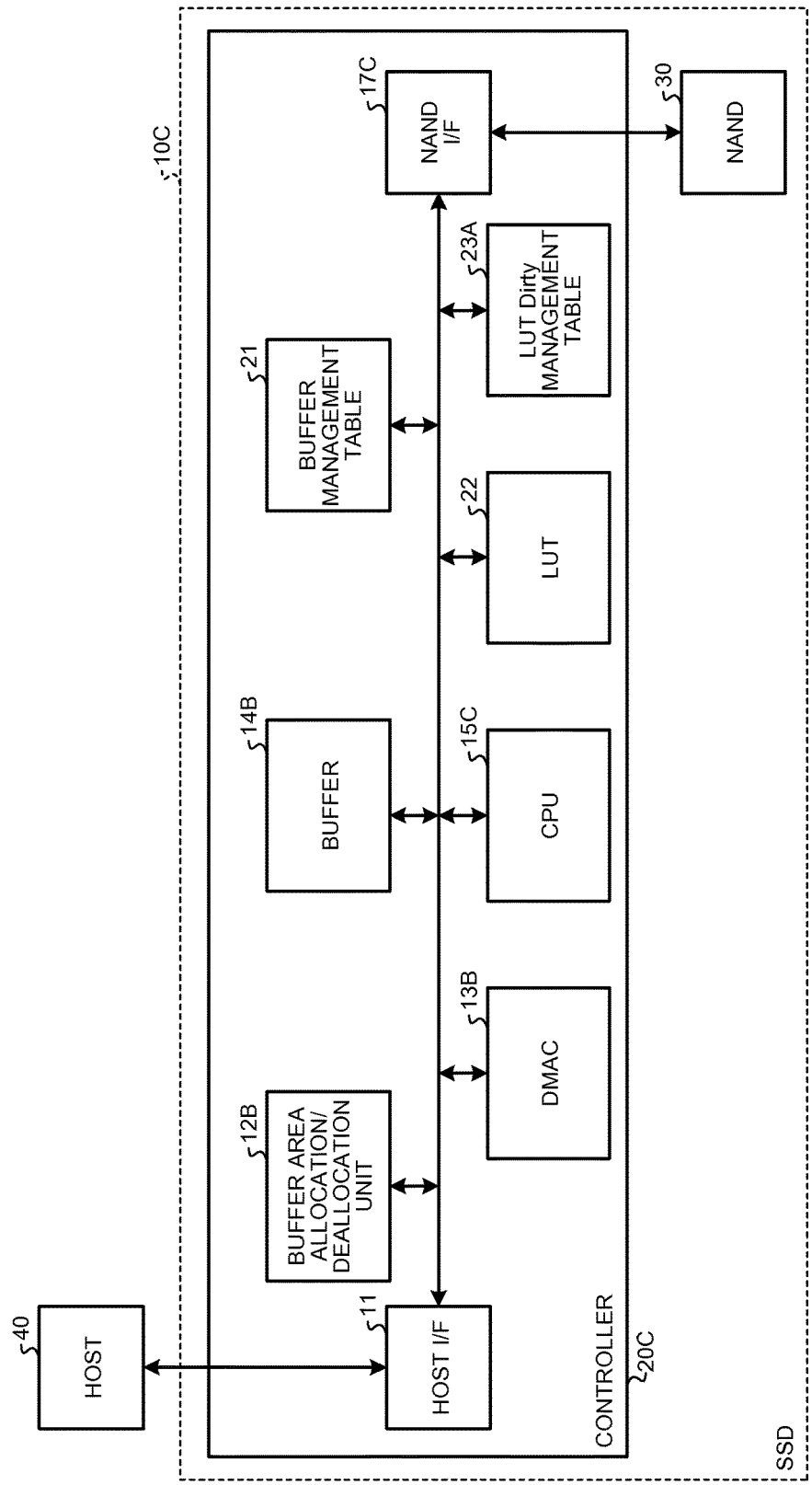
FIG. 9 is a diagram illustrating the structure of a memory system according to a second embodiment.

FIG. 9 is a diagram illustrating the structure of a memory system according to the second embodiment. In this embodiment, a case in which the memory system is an SSD 10C that is not provided with a battery or a capacitor used to reliably non-volatilize, for example, user data or management information even when illegal power shutdown occurs will be described. Similarly to the SSD 10A, the SSD 10C according to this embodiment writes the user data to a NAND 30 and then writes an LUT dirty portion (one or more LUT dirty portions) including an updated entry of an LUT 22 to the NAND 30.

Among the components illustrated in FIG. 9, components having the same functions as those in the SSD 10A according to the first embodiment are denoted by the same reference numerals and the description thereof will not be repeated.

The SSD 10C is connected to an external device such as a host 40. The SSD 10C includes a controller 20C and the NAND 30. The controller 20C is, for example, a semiconductor chip and controls the transmission of data between the host 40 and the NAND 30, similarly to the controller 20A.

The controller 20C temporarily stores the user data transmitted from the host 40 and performs the DMA transmission of the temporarily stored user data to the NAND 30. In this way, the DMA-transmitted user data is written to the NAND 30. In addition, the controller 20C writes the LUT dirty portion, which is an updated portion of the entries of the LUT 22, to the NAND 30.

The controller 20C includes a host I/F 11 and a NAND I/F 17C. In addition, the controller 20C includes a buffer area allocation/deallocation unit 12B, a DMAC 13B, the buffer 14B, a CPU 15C, a buffer management table 21, the LUT 22, and an LUT dirty management table 23A. In the controller 20C, the above-mentioned components are connected to each other by, for example, a bus.

The NAND I/F 17C has a function of transmitting a command to the NAND 30. In addition, the NAND I/F 17C has a function of monitoring the status of the NAND 30. The NAND I/F 17C further includes a function of transmitting data (for example, the user data or the LUT dirty portion) stored in the controller 20C to the NAND 30 and a function of receiving data (for example, the user data or the LUT 22) from the NAND 30. The buffer 14B temporarily stores the user data and the LUT dirty portion. The buffer 14B is not used only for buffering user data, but also used as memory for temporarily storing LUT dirty portions.

The buffer area allocation/deallocation unit 12B has a function which determines the location of the LUT dirty portion in the buffer 14B (hereinafter, referred to as an LUT physical address in a buffer) and allocates a necessary area of the buffer 14B and a function which deallocates the buffer area having the LUT dirty portion stored therein, in addition to the functions of the buffer area allocation/deallocation unit 12A.

The DMAC 13B has a function which performs the DMA transmission of a portion of the LUT 22 to the buffer 14B or performs DMA transmission from the buffer 14B to the LUT 22, in addition to the functions of the DMAC 13A. In addition, the DMAC 13B has a function which DMA-transmits correspondence information between the logical address and the physical address in the LUT 22 or all information in the LUT 22 from the NAND 30 to the LUT 22 In addition, the DMAC 13B has a function which DMA-transmits correspondence information between the logical address and the physical address in the LUT 22 or all information in the LUT 22 from the LUT 22 to the NAND 30.

The LUT dirty management table 23A stores correspondence information in which a set identification number corresponding to the LUT dirty portion is associated with the LUT physical address in the buffer. The correspondence information is not limited to the data table and may be any information as long as it indicates the correspondence relationship between the set identification number and the LUT physical address in the buffer. In the LUT dirty management table 23A according to this embodiment, L consecutive entries (L is a natural number) of the LUT 22 form one group and the set identification numbers are sequentially given to each group. In other words, the set identification number is equal to the quotient when the logical addresses of the user data are divided by L. The state of the set having the set identification number given thereto is managed by one entry of the LUT dirty management table 23A. The set identification number is not limited to a number and may be any information as long as it can identify the group. When a write command is received from the host 40 and an LUT update process is performed, a group (LUT dirty portion) including the updated entry of the LUT 22 is copied to the buffer 14B. In this embodiment, the LUT physical address in the buffer which is registered in the LUT dirty management table 23A is the physical address of the buffer storing the LUT dirty portion. When consistency is guaranteed in the user data and the information of the LUT 22, it is not necessary to copy the LUT dirty portion to the buffer 14B and to register the LUT physical address in the buffer in the LUT dirty management table 23A.

FIG. 10 is a diagram illustrating the structure of the LUT dirty management table according to the second embodiment. FIG. 10 illustrates an example of the structure of the LUT dirty management table 23A. In the LUT dirty management table 23A, an entry is provided for each dirty group of the LUT 22. In each entry, Valid, an set identification number, Dirty, an LUT physical address in a buffer, and user data NAND write completion information are associated with each other.

The "Valid" indicates the validity of each entry in the LUT dirty management table 23A. In an initial state, information indicating "invalid" is registered in the "Valid" field. The set identification number indicates a set identification number given to each group of the LUT 22. In the initial state, an invalid value is registered in the set identification number field. The "Dirty" indicates an updated logical address belonging to the set identification number. In the initial state, information indicating "clean" is registered in the "Dirty" field. The LUT physical address in the buffer indicates the physical address of the LUT dirty portion in the buffer 14B. In the initial state, an invalid value is registered in the LUT-physical-address-in-buffer field. The user data NAND write completion information of the entry is information indicating whether the process of writing user data to the NAND 30 has been completed. In the initial state, information indicating "non-completed" is registered in the user data NAND write completion information field.

The CPU 15C has the function of a second physical address determination unit which determines a physical address indicating the location of the LUT dirty portion in the NAND 30, in addition to the functions of the CPU 15A. In addition, the CPU 15C has a function which acquires an invalid entry of the LUT dirty management table 23A, that is, an entry in which information indicating "invalid" is registered in the "Valid" field. The CPU 15C further has a function which updates the Valid, the set identification number, the Dirty, the LUT physical address in the buffer in each entry of the LUT dirty management table 23A, if necessary.

The CPU 15C determines whether a predetermined condition is satisfied and determines the time when the LUT dirty portion starts to be transmitted from the buffer 14B to the NAND 30. Here, the predetermined condition may be any condition. For example, the predetermined condition is that the amount of LUT Dirty portion in the buffer 14B is equal to or greater than a predetermined value, that a predetermined period of time has elapsed from the initial LUT update process after the previous DMA transmission of the user data and the LUT dirty portion to the NAND 30, or that a specific command is received from the host 40. In this embodiment, a case in which the predetermined condition is that the amount of LUT dirty portion buffered which corresponds to the user data written to the NAND 30 is equal to or greater than a predetermined value will be described.

Figure 11:
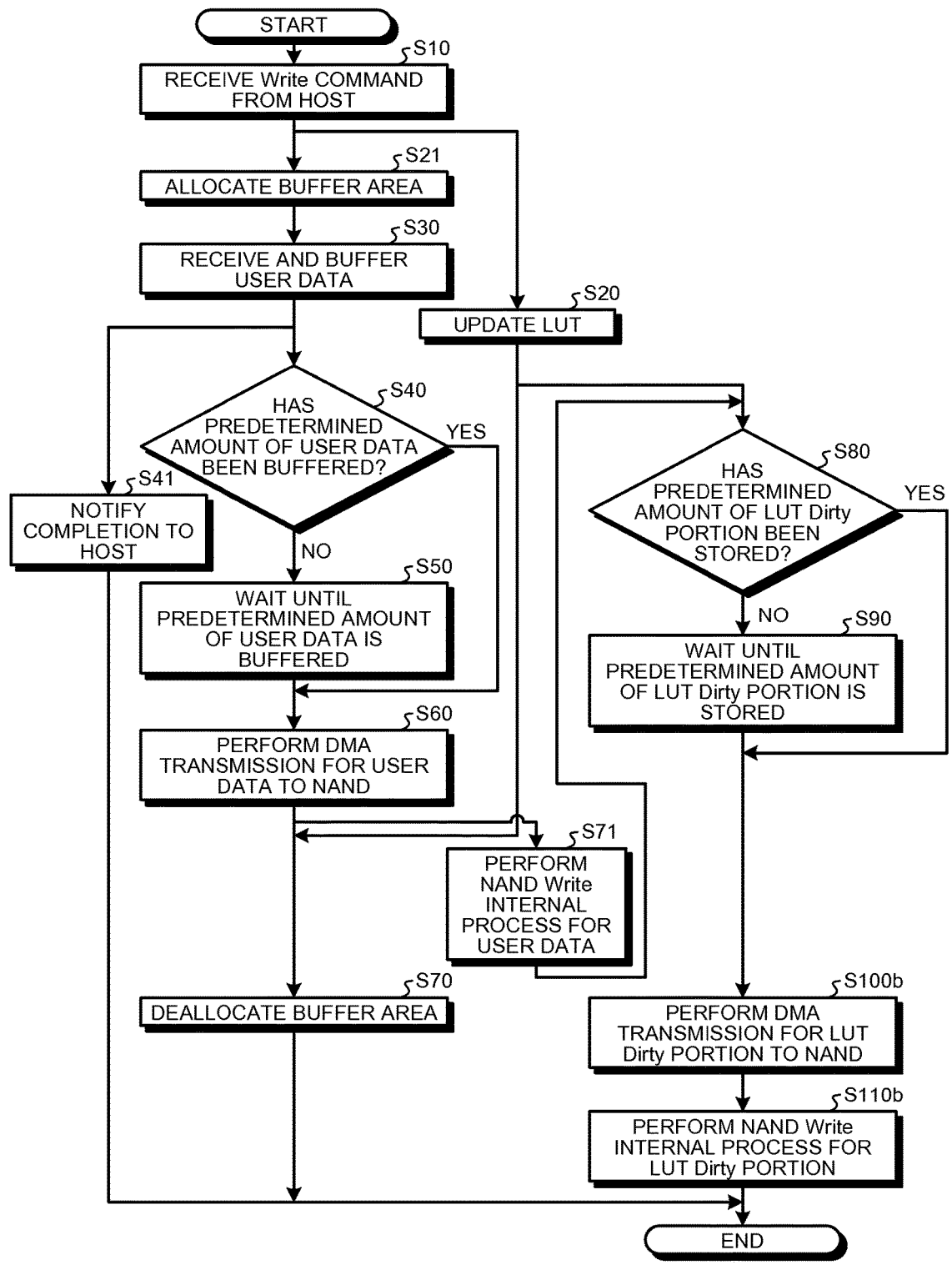
FIG. 11 is a diagram illustrating the procedure of the operation of the memory system according to the second embodiment.

FIG. 11 is a diagram illustrating the procedure of the operation of the memory system according to the second embodiment. The SSD 10C writes the user data to the NAND 30 through the buffer 14B according to the same operation procedure as that of the SSD 10A. Therefore, in this embodiment, the description of the process from step S21 to step S71 which is the same as that in the SSD 10A will not be repeated.

In the SSD 10C, a process of writing the user data to the NAND 30 and a process of writing the LUT dirty portion to the NAND 30 are sequentially performed.

When receiving a write command from the host 40, similarly to the SSD 10A, the SSD 10C performs a process of buffering the user data corresponding to the write command and a process of performing the DMA transmission of the user data to the NAND 30 (steps S21, S30, S40, S50, and S60), a process of updating the LUT 22 (step S20), and a process of notifying the host 40 of the completion of a writing process (step S41) in parallel.

When the process of updating the LUT 22 is performed, first, the CPU 15C acquires an invalid entry of the LUT dirty management table 23A. Specifically, the CPU 15C acquires an entry in which information indicating "invalid" is registered in the "Valid" field in the LUT dirty management table 23A. The CPU 15C registers information indicating "valid" in the "Valid" field, the set identification number of the group, which includes the logical address to be subjected to the LUT update process, in the set identification number field, information indicating "clean" in the "Dirty" field, and information indicating "non-completed" in the user data NAND write completion information field in the acquired entry.

The CPU 15C may acquire the invalid entry of the LUT dirty management table in advance before a write command is received from the host 40. The CPU 15C requests the buffer area allocation/deallocation unit 12B to allocate a buffer area required to temporarily store the LUT dirty portion to be updated. The buffer area allocation/deallocation unit 12B receives the request, allocates a buffer area, and transmits the LUT physical address in the buffer to the CPU 15C. The CPU 15C registers the received LUT physical address in the buffer in the LUT-physical-address-in-buffer filed of the acquired entry in the LUT dirty management table. At the same time, the CPU 15C issues a DMA transmission request to the DMAC 13B. The DMA transmission request causes a portion corresponding to the group including the logical address which is designated by the write command from the host 40 to be transmitted from the LUT 22 to the allocated area of the buffer 14B. The DMAC 13B receives the transmission request and performs the DMA transmission process.

When receiving a notice indicating the completion of the DMA transmission from the DMAC 13B, the CPU 15C registers information indicating "dirty" in the "Dirty" field of the entry in the LUT dirty management table. Then, the CPU 15C registers the logical address designated by the write command from the host 40 and the physical address in the NAND, which corresponds to the logical address, in the entry with the corresponding logical address in the corresponding group of the LUT 22 copied to the buffer 14B so as to be associated with each other. When the process of updating the LUT 22 is completed, the CPU 15C registers information indicating "completed" in the LUT update completion information field of the entry in a buffer management table 21 which is acquired immediately after the CPU 15C receives the write command.

When the writing of the user data to the NAND 30 (step S71) is completed, the NAND I/F 17C which monitors the state of the NAND 30 notifies the CPU 15C of the completion of the writing of the user data. When receiving the completion notice, the CPU 15C registers information indicating "completed" in the user data NAND write completion information field of the entry, which corresponds to the user data written to the NAND, in the LUT dirty management table 23A. In addition, the CPU 15C checks whether the amount of stored LUT dirty portion which corresponds to the user data written to the NAND 30 is equal to or greater than a predetermined value (step S80). When the amount of stored LUT dirty portion which corresponds to the user data written to the NAND 30 is not equal to or greater than a predetermined value (step S80, No), the CPU 15C waits until a predetermined amount of LUT dirty portion is stored (step S90).

On the other hand, when the amount of stored LUT dirty portion which corresponds to the user data written to the NAND 30 is equal to or greater than a predetermined value (step S80, Yes), the CPU 15C issues a transmission request to the DMAC 13B so as to perform the DMA transmission of the LUT dirty portion in the buffer 14B, which is managed by the LUT dirty management table 23A, to the NAND 30. When receiving the transmission request from the CPU 15C, the DMAC 13B performs the DMA transmission of the LUT dirty portion to the NAND 30 through the NAND I/F 17C (step S100b).

When the DMA transmission of the LUT dirty portion is completed, the DMAC 13B notifies the CPU 15C of the completion of the DMA transmission. When receiving a transmission completion notice from the DMAC 13B, the CPU 15C issues a command to perform the NAND write internal process to the NAND 30 through the NAND I/F 17C. When receiving the command from the CPU 15C, the NAND 30 performs the NAND write internal process. In this way, the LUT dirty portion is written to the NAND 30 (step S110b).

The NAND I/F 17C monitors the state of the NAND 30 which is performing the NAND write internal process for the LUT dirty portion. When the NAND write internal process is completed, the NAND I/F 17C issues a completion notice to the CPU 15C. When receiving the completion notice, the CPU 15C issues, to the DMAC 13B, a request to DMA-transmit a portion, which corresponds to the group including the LUT dirty portion written to the NAND 30, in the LUT dirty management table 23A to the corresponding entry of the LUT 22. When receiving the request, the DMAC 13B performs the DMA transmission of the corresponding LUT dirty portion. When the DMA transmission is completed, the DMAC 13B notifies the CPU 15C of the completion of the transmission. In other words, a portion of the LUT 22 which has been copied immediately before the update of the LUT returns to a copy source.

When receiving the transmission completion notice, the CPU 15C invalidates the registered content of the entry in the LUT dirty management table 23A. Specifically, the CPU 15C registers information indicating "invalid" in the "Valid" field of the corresponding entry in the LUT dirty management table 23A.

At the same time, the CPU 15C designates the LUT dirty physical address of the buffer area of the LUT dirty portion in the buffer and issues a request to deallocate the buffer area to the buffer area allocation/deallocation unit 12B. When receiving the buffer area deallocation request from the CPU 15C, the buffer area allocation/deallocation unit 12B deallocates the buffer area.

As such, in the SSD 10C, similarly to the SSD 10A, when the writing of the user data to the NAND 30 is completed, the entry of the LUT 22 corresponding to the user data written to the NAND 30 is similarly written to the NAND 30.

As such, according to the second embodiment, it is possible to avoid the situation in which the SSD 10C is not capable of accessing all of the data written by the host 40. For example, when a write command is received and the LUT 22 is updated, there is a period for which the LUT 22 indicates an unwritten area of the NAND 30. For this period, the user data which has been received from the host 40 and then buffered has not been written to the NAND 30. In a case in which illegal power shutdown occurs at the time only the LUT 22 is written to the NAND 30 and the user data has not been written to the NAND 30 for this period and data is read on the basis of the LUT 22 after the next startup, an unwritten area is read since the LUT 22 indicates the unwritten area. As a result, data (unwritten data) which has not been written in the NAND 30 is transmitted to the host 40.

In the SSD 10C according to this embodiment, similarly to the SSD 10A, it is possible to reduce the buffer size of the user data and to write the LUT 22 to the NAND 30 after the user data is written to the NAND 30. Therefore, the LUT 22 written to the NAND 30 does not indicate an unwritten area. As a result, even when illegal power shutdown occurs, data in the unwritten area is not transmitted to the host 40 at the time of the next start-up.

Third Embodiment

Next, a third embodiment will be described with reference to FIGS. 12 to 16. In the third embodiment, an SSD is used which is not provided with a battery or a capacitor used to reliably non-volatilize, for example, user data or management information even when illegal power shutdown occurs. In the SSD according to the third embodiment, management information log including information for managing an LUT 22 is non-volatilized after user data and an updated portion of the LUT 22 are non-volatilized. Therefore, even when illegal power shutdown occurs, it is possible to access the user data at the time of the next startup. Specifically, in the SSD according to the third embodiment, similarly to the SSD 10C, it is possible to access the latest user data or the user data which is not the latest, for example, the user data before one or more generations, according to the conditions of the SSD.

Figure 12:
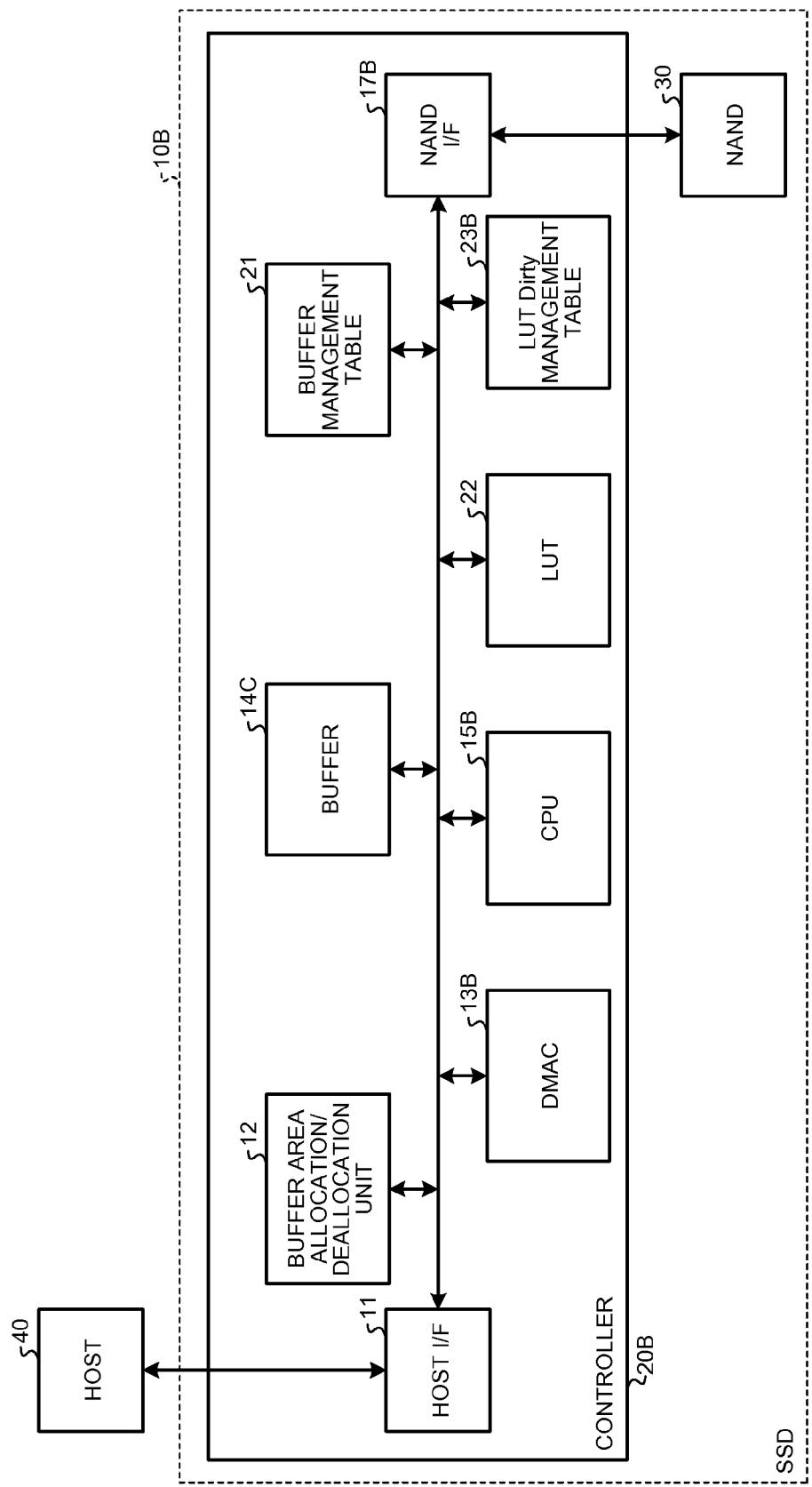
FIG. 12 is a diagram illustrating the structure of a memory system according to a third embodiment.

FIG. 12 is a diagram illustrating the structure of a memory system according to the third embodiment. In this embodiment, a case in which the memory system is an SSD 10B that is not provided with a battery or a capacitor used to reliably non-volatilize, for example, user data or management information even when illegal power shutdown occurs will be described. The SSD 10B according to this embodiment writes user data and the LUT dirty portion to a NAND 30 and then writes a management information log to the NAND 30.

Among the components illustrated in FIG. 12, components having the same functions as those in the SSD 10A according to the first embodiment illustrated in FIG. 1 or the SSD 10C according to the second embodiment illustrated in FIG. 9 are denoted by the same reference numerals and the description thereof will not be repeated.

The SSD 10B is connected to an external device such as a host 40. The SSD 10B includes a controller 20B and the NAND 30. The controller 20B is, for example, a semiconductor chip and controls the transmission of data between the host 40 and the NAND 30, similarly to the controller 20A.

The controller 20B temporarily stores user data transmitted from the host 40 and performs the DMA transmission of the temporarily stored user data to the NAND 30. In this way, the DMA-transmitted user data is written to the NAND 30. In addition, the controller 20B writes the LUT dirty portion, which is an updated portion of the entry of the LUT 22, to the NAND 30, generates a log (management information log) including the management information of the LUT 22, and writes the management information log to the NAND 30.

The controller 20B includes a host I/F 11 and a NAND I/F 17B. In addition, the controller 20B includes a buffer area allocation/deallocation unit 12, a DMAC 13B, a buffer 14C, and a CPU 15B. The controller 20B further includes a buffer management table 21, the LUT 22, and an LUT dirty management table 23B. In the controller 20B, the above-mentioned components are connected to each other by, for example, a bus.

The NAND I/F 17B has a function of issuing a command to the NAND 30. In addition, the NAND I/F 17B has a function of monitoring the state of the NAND 30. The NAND I/F 17B further has a function of transmitting data (for example, the user data, the LUT 22, or the management information log) stored in the controller 20B to the NAND 30 and a function of receiving data (for example, the LUT dirty portion, or the management information log) from the NAND 30.

The management information log includes information about the physical address of the LUT dirty portion in the NAND 30. Similarly to the SSD 10C, in the LUT 22, L consecutive entries (L is a natural number) form one group and set identification numbers are given to each group. The LUT 22 is written to the NAND 30 while the number of groups is the minimum. In the management information log, set identification number of the group including the LUT dirty portion written to the NAND 30 is associated with the physical address of the LUT dirty portion in the NAND 30.

For example, it is assumed that, in the LUT 22, entries in an M-th set (M is a natural number) are the correspondence relationship between 128 pairs of logical addresses and physical addresses in the NAND. In this case, when any one of the physical addresses in the NAND in the entry in the M-th set is updated, all of the entries in the M-th set are written as the LUT dirty portion to the NAND 30. In this case, in the management information log, information (set identification number) indicating that the LUT dirty portion is the entries in the M-th set is associated with the physical address (a dirty portion address which will be described below) in the NAND 30 where the M-th set (128 entries) is written.

The correspondence information between the LUT dirty portion included in the management information log and the physical address of the LUT dirty portion in the NAND 30 is represented by, for example, a data table. The correspondence information is not limited to the data table and may be any information as long as it indicates the correspondence relationship between the set identification number and the dirty portion address.

The controller 20B writes the management information log to the NAND 30. Therefore, at the time of the next start-up, the controller 20B reads the management information log to check the position of the LUT dirty portion in the NAND 30.

In this embodiment, the buffer 14C temporarily stores the user data, the LUT dirty portion, and the management information log. The DMAC 13B transmits the user data received from the host 40 to the buffer 14C. In addition, the DMAC 13B transmits the user data, the LUT dirty portion, and the management information log stored in the buffer 14C to the NAND 30.

The LUT dirty management table 23B stores correspondence information in which the set identification number corresponding to the LUT dirty portion is associated with the LUT physical address in the buffer. The correspondence information is not limited to the table and may be any information as long as it indicates the correspondence relationship between the set identification number and the LUT physical address in the buffer.

FIG. 13 is a diagram illustrating the structure of the LUT dirty management table according to the third embodiment. FIG. 13 illustrates an example of the structure of the LUT dirty management table 23B. In the LUT dirty management table 23B, an entry is provided for each dirty group of the LUT 22. In each entry, Valid, the set identification number, Dirty, an LUT physical address in a NAND, an LUT physical address in a buffer, user data NAND write completion information, and LUT NAND write completion information are associated with each other.

For the Valid, the set identification number, the Dirty, the LUT physical address in the buffer, and the user data NAND write completion information, the same information as that in the LUT dirty management table 23A is managed. The LUT NAND write completion information indicates whether the writing of a LUT dirty portion of a corresponding entry to the NAND 30 has been completed. In an initial state, information indicating "non-completed" is registered in the LUT NAND write completion information field.

The CPU 15B has the function of a third physical address determination unit which determines a physical address indicating the location of the management information log in the NAND 30, in addition to the functions of the CPU 15C.

The CPU 15B further has a function of generating the management information log in the buffer 14C. In addition, the CPU 15B has a function of determining the time when the management information log starts to be transmitted from the buffer 14C to the NAND 30. When both the NAND write internal process for the user data and the NAND write internal process for the LUT dirty portion are completed, the CPU 15B determines the completion time to be the time when the DMA transmission of the management information log to the NAND 30 starts.

Figure 14:
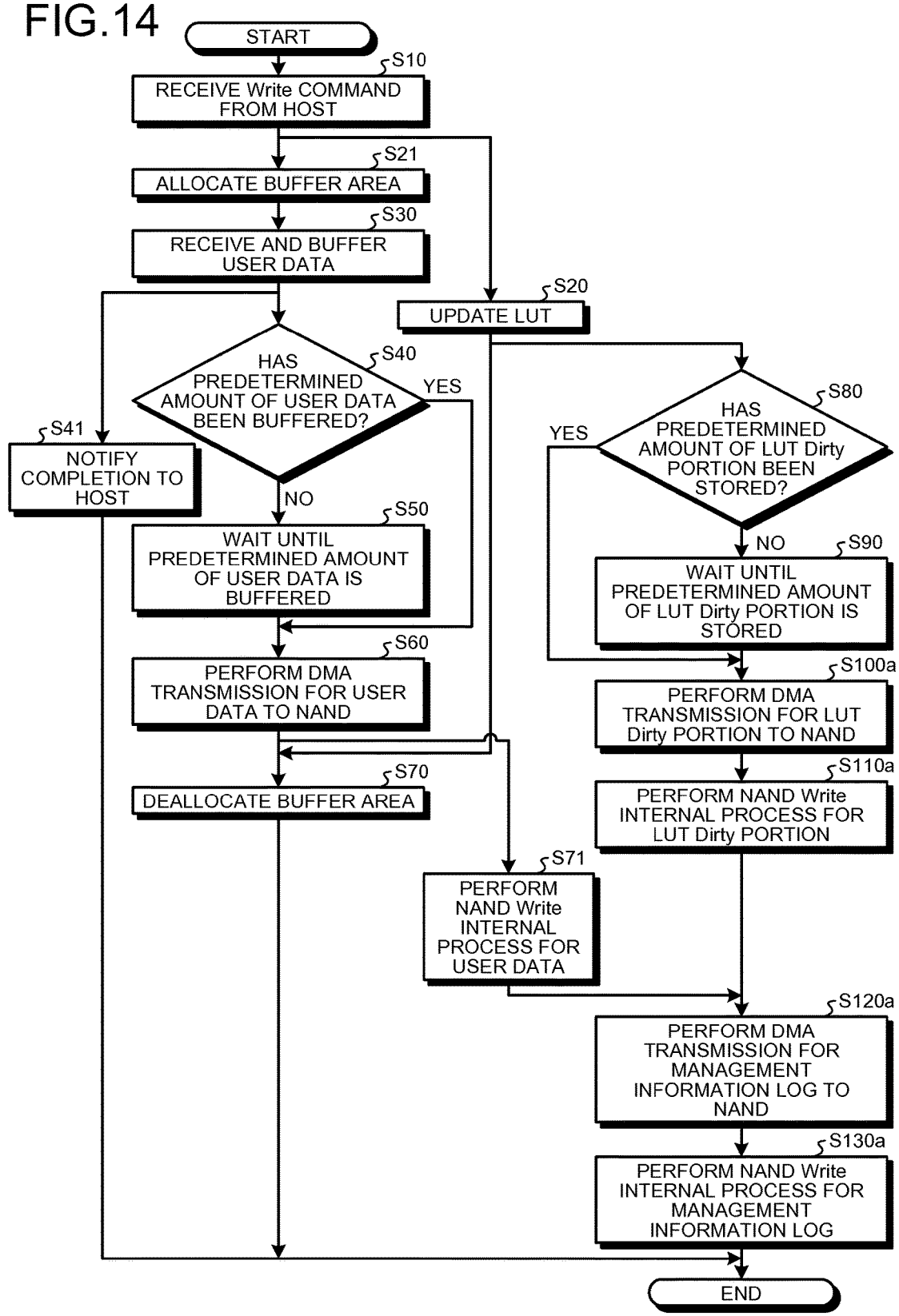
FIG. 14 is a diagram illustrating the procedure of the operation of the memory system according to the third embodiment.

FIG. 14 is a diagram illustrating the procedure of the operation of the memory system according to the third embodiment. The SSD 10B writes the user data to the NAND 30 through the buffer 14C according to the same operation procedure as that of the SSD 10C. That is, the SSD 10B performs the buffering of the user data, the update of the LUT 22, the deallocation of a buffer area, and the writing of the user data to the NAND 30 according to the same operation procedure as that of the SSD 10A. Therefore, in this embodiment, the description of the process from step S10 to step S71 which is the same as that in the SSD 10A will not be repeated.

In the SSD 10B, after the LUT 22 is updated (step S20), a process of writing the LUT dirty portion to the NAND 30 (steps S80 to S110a), a process of deallocating the buffer area (step S70), and the NAND write internal process for the user data (step S71) are performed in parallel.

When the LUT dirty portion is written to the NAND 30, the CPU 15B checks whether a predetermined condition is satisfied. Here, the predetermined condition may be any condition. For example, the predetermined condition is that the amount of LUT dirty portion stored in the buffer 14C is equal to or greater than a predetermined value, that a predetermined period of time has elapsed, or that a specific command is received from the host 40. In this embodiment, a case in which the predetermined condition is that a predetermined amount of LUT dirty portion is stored in the buffer 14C will be described. When the LUT dirty portion is written to the NAND 30, the CPU 15B checks whether the amount of LUT dirty portion stored is equal to or greater than a predetermined value (step S80). When the amount of LUT dirty portion stored in the buffer 14C is not equal to or greater than a predetermined value (step S80, No), the CPU 15B waits until a predetermined amount of LUT dirty portion is stored in the LUT 22 (step S90). On the other hand, when a predetermined amount of LUT dirty portion is stored in the buffer 14C, the CPU 15B issues a transmission request to the DMAC 13B so as to DMA-transmit the LUT dirty portion stored in the buffer 14C, which is managed by the LUT dirty management table 23B, to the NAND 30. When receiving the transmission request from the CPU 15B, the DMAC 13B performs the DMA transmission of the LUT dirty portion to the NAND 30 (step S100a).

When the DMA transmission of the LUT dirty portion is completed, the DMAC 13B notifies the CPU 15B of the completion of the DMA transmission. When receiving a transmission completion notice from the DMAC 13B, the CPU 15B issues a command to perform the NAND write internal process to the NAND 30 through the NAND I/F 17B. When receiving the command from the CPU 15B, the NAND 30 performs the NAND write internal process. In this way, the LUT dirty portion is written to the NAND 30 (step S110a).

The NAND I/F 17B monitors the state of the NAND 30 which is performing the NAND write internal process for the LUT dirty portion. When the NAND write internal process is completed, the NAND I/F 17B issues a completion notice to the CPU 15B. When receiving the completion notice, the CPU 15B issues, to the DMAC 13B, a request to perform the DMA transmission of a portion, which corresponds to the group including the LUT dirty portion written to the NAND 30, to the LUT 22. When receiving the request, the DMAC 13B performs the DMA transmission of the corresponding LUT dirty portion. When the DMA transmission is completed, the DMAC 13B notifies the CPU 15B of the completion of the transmission.

At the same time, when the LUT dirty portion is written to the NAND 30 and the NAND I/F 17B receives a notice indicating the completion of the writing of the LUT dirty portion, the CPU 15B registers information indicating "completed" in the LUT NAND write completion information field of the corresponding entry in the LUT dirty management table 23B. Similarly, when the writing of the user data to the NAND 30 is completed, the CPU 15B registers information indicating "completed" in the user data NAND write completion information field of the LUT dirty management table 23B.

When the update of the LUT dirty management table 23B ends, the CPU 15B checks whether information indicating "completed" has been registered in both the user data NAND write completion information field and the LUT NAND write completion information field, with reference to the user data NAND write completion information and the LUT NAND write completion information in the updated entry. When information indicating "non-completed" has not been registered in either the user data NAND write completion information field or the LUT NAND write completion information field, the CPU 15B does not perform any process. When the information indicating "complete" has been registered in both the user data NAND write completion information field and the LUT NAND write completion information field, this indicates that the writing of both the user data and the LUT dirty portion to the NAND 30 has been completed. At that time, the CPU 15B generates the management information log and describes, in the log, the set identification number and the LUT physical address in the NAND in the corresponding entry.

The CPU 15B writes the generated management information log to the NAND at any time. Specifically, the CPU 15B issues a request to the DMAC 13B so as to perform the DMA transmission of the management information log. The DMAC 13B performs the DMA transmission of the management information log to the NAND 30 through the NAND I/F 17B in response to the transmission request (step S120a). When the transmission is completed, the DMAC 13B notifies the CPU 15B of the completion of the transmission. The CPU 15B issues a command to perform the NAND write internal process to the NAND 30 through the NAND I/F 17B. When receiving the command, the NAND 30 performs the NAND write internal process. In this way, the management information log is written to the NAND 30 (step S130a).

The process of deallocating the buffer area (step S70) and the process of writing the management information log to the NAND 30 (steps S120a and S130a) may be performed in parallel. In addition, the process of writing the LUT dirty portion and the management information log to the NAND 30 (steps S80 to S130a) and the process of notifying the host 40 of the completion of the write process (step S41) may be performed in parallel.

The SSD 10B may write the LUT 22 to the NAND 30 at a predetermined time. In this case, the LUT dirty portion for the LUT 22 written to the NAND 30 is written to the NAND 30.

However, when the SSD 10X performs the following operations (a) to (d), an operation error occurs in the SSD 10X:

(a) The SSD 10X buffers the user data and updates the LUT;

(b) The SSD 10X writes the LUT dirty portion to the NAND;

(c) The SSD 10X writes the management information log to the NAND; and (d) Illegal power shutdown occurs.

In this case, in the SSD 10X, since the latest user data has not been written to the NAND, the LUT indicates an unwritten area. Therefore, when the SSD 10X reads the latest user data after the next start-up, the unwritten area is transmitted to the host 40. At the time of the next start-up, when the SSD 10X reads the management information log from the NAND and reflects the management information log in the LUT 22 and the host 40 reads the unwritten area, the SSD 10X transmits the unwritten area to the host 40 since the LUT indicates the unwritten area. As a result, an operation error occurs.

In order to prevent the operation error, the SSD 10B according to this embodiment writes the management information log to the NAND 30 after the NAND write internal process for the user data and the LUT dirty portion is completed. Here, a process when the SSD 10B operates will be described.

When the SSD 10B is operated, for example, a portion of or the entire LUT 22 is read from the NAND 30. In this case, for example, the following processes (1) to (5) are performed.

(1) The SSD 10B takes a snapshot of the LUT 22 during operation. In other words, the SSD 10B performs a process of writing the entire LUT 22 to the NAND 30. In addition, when a predetermined condition is satisfied, the SSD 10B writes the LUT dirty portion to the NAND 30.

(2) The SSD 10B is turned off.

(3) The SSD 10B is powered on.

(4) The SSD 10B reads the snapshot of the LUT 22 from the NAND 30.

(5) Then, the SSD 10B reads the LUT dirty portion from the NAND 30 and reflects the LUT dirty portion in the LUT 22.

When the processes (1) to (5) are performed, the LUT 22 indicates the latest data.

In the SSD 10B, in some cases, illegal power shutdown occurs before the NAND write internal process for the user data is completed or before the NAND write internal process for the LUT dirty portion is completed. In this case, the NAND write internal process for the management information log is not performed. Therefore, the management information log is lost due to illegal power shutdown. As a result, in the SSD 10B, the next start-up is performed, with the management information log before one generation being stored. Therefore, when data which has been written to the SSD 10B by the host 40 is read, it is possible to avoid the return of an unwritten area. As such, in the SSD 10B, even when the LUT 22 is updated before the transmission of the user data to the NAND 30 is completed and is non-volatilized, it is possible to perform a recovery in a short time.

When the NAND write internal process is performed for the management information log before the NAND write internal process is performed for the user data or the LUT dirty portion, illegal power shutdown is recognized on the basis of the management information log at the time of the next start-up. The management information log stores information (normal power shutdown information) indicating that power is normally turned off. Therefore, when there is no normal power shutdown information at the time of the next start-up, it is determined that illegal power shutdown occurs.

In this case, it is necessary to perform a recovery for a long time. For example, an SSD according to the related art periodically takes a snapshot of management information such as an LUT. Then, the SSD according to the related art reads all data, which has been written after the last snapshot, from the NAND, determines the latest data, and restores the data. The restoration of the data is data recovery. In the SSD according to the related art, since an enormous amount of data is read from the NAND, it takes a lot of time for the recovery.

When the user data lost due to the illegal power shutdown is data which has been written to the NAND 30 first, there is no user data before one generation. In addition, when data is written to the same LBA a plurality of times and illegal power shutdown occurs, the next start-up is performed, with the user data before two or more generations being stored in the SSD 10B.

In this embodiment, after predetermined amount of LUT dirty portion is stored in the LUT 22, the DMA transmission of the LUT dirty portion to the NAND 30 is performed. However, the DMA transmission of the LUT dirty portion to the NAND 30 is performed at a different time. For example, the SSD 10B may perform the DMA transmission of the LUT dirty portion to the NAND 30 after a predetermined period of time has elapsed. In addition, when the SSD 10B caches a portion of the LUT 22, the SSD 10B may perform the DMA transmission of the LUT dirty portion to the NAND 30 immediately before the portion of the LUT 22 is evicted due to a cache miss.

In this embodiment, when the update of the LUT 22 is completed, the SSD 10B writes the LUT dirty portion to the NAND 30. However, when an update reservation for the LUT 22 is completed, the SSD 10B may write the LUT dirty portion to the NAND 30.

In addition, the LUT 22 may be stored in, for example, an MRAM which is an example of the non-volatile memory. In this structure, when illegal power shutdown occurs in the SSD 10B, the LUT 22 in the MRAM is not lost while the user data in the buffer 14C is lost. Therefore, while the user data written to the NAND 30 is user data before one generation, the LUT 22 corresponds to the latest user data. As a result, inconsistency occurs between the user data written to the NAND 30 and the LUT 22 in the SSD 10B.

As such, when a non-volatile memory, such as an MRAM, is used for the LUT 22, for example, an update reservation queue is arranged in the SSD 10B. When the SSD 10B receives a write command from the host 40, the CPU 15B stores an update reservation for the LUT 22 in the update reservation queue. In addition, the CPU 15B actually updates the LUT 22 on the basis of the update reservation in the update reservation queue immediately before the buffer area is deallocated. Therefore, even when the non-volatile memory is used for the LUT 22, there is no inconsistency between the user data written to the NAND 30 and the LUT 22.

As described above, according to the third embodiment, in the SSD 10B, it is possible to avoid the transmission of data in the unwritten area to the host 40. When the SSD 10B receives a write command and updates the LUT 22, there is a period for which the LUT 22 indicates the unwritten area of the NAND 30. For this period, the user data which has been received from the host 40 and then buffered has not been written to the NAND 30. In the case in which, for this period, only the LUT 22 is written to the NAND 30 and the user data has not been written to the NAND 30, when illegal power shutdown occurs and data is read on the basis of the LUT 22 after the next startup, data in the unwritten area is read since the LUT 22 indicates the unwritten area. As a result, data (unwritten data) which has not been written to the NAND 30 is transmitted to the host 40.

In the SSD 10B according to this embodiment, after the user data and the LUT dirty portion are written to the NAND 30, the management information log is written to the NAND 30. Therefore, according to the third embodiment, even when illegal power shutdown occurs, it is possible to return the SSD 10B to the state before the previous power shutdown occurs on the basis of information about the management information log at the time of the next start-up. Therefore, data in an unwritten area is not transmitted to the host 40. As a result, it is possible to improve the reliability of the SSD 10B.

In this embodiment, the SSD 10B includes, for example, the LUT 22. However, a device other than the SSD 10B may include, for example, the LUT 22. For example, instead of the SSD 10B, the host 40 may include at least one of the buffer area allocation/deallocation unit 12, the DMAC 13B, the buffer 14C, and the CPU 15B. In addition, for example, instead of the SSD 10B, the host 40 may include at least one of the buffer management table 21 and the LUT 22.

Figure 15:
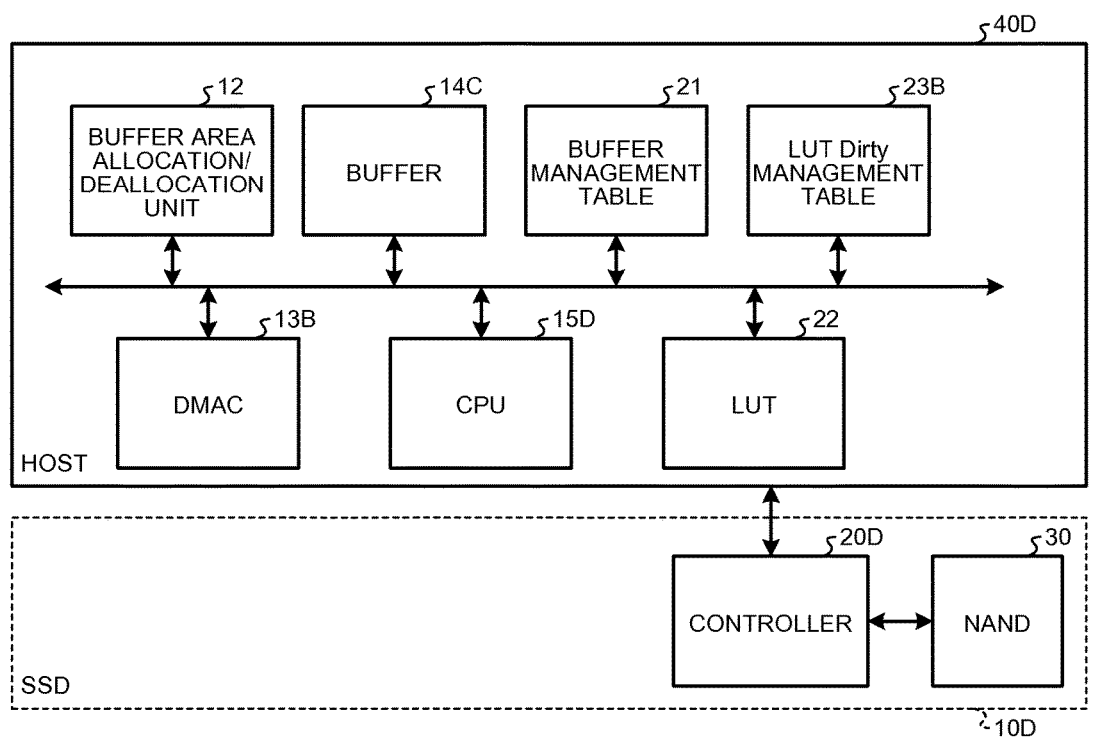
FIG. 15 is a diagram illustrating another example of the structure of the memory system according to the third embodiment.

Next, a memory system in which the components of the SSD 10B are provided in a device other than the SSD 10B will be described. FIG. 15 is a diagram illustrating another example of the structure of the memory system according to the third embodiment. Among the components illustrated in FIG. 15, components having the same functions as those in the SSDs 10A and 10C illustrated in FIGS. 1 and 9 are denoted by the same reference numerals and the description thereof will not be repeated.

An SSD 10D is connected to an external device such as a host 40D. The number of the SSD 10D is not limited to one, but may be any number. The SSD 10D includes a controller 20D and a NAND 30. The controller 20D is, for example, a semiconductor chip and controls the transmission of data between the host 40D and the NAND 30, similarly to the controller 20B.

The host 40D includes a buffer area allocation/deallocation unit 12, a DMAC 13B, a buffer 14C, and a CPU 15D. In addition, the host 40D includes a buffer management table 21, an LUT 22, and an LUT dirty management table 23B. The CPU 15D has the functions of the CPU 15B.

The controller 20D transmits user data to the NAND 30 in response to an instruction from the host 40D. Then, the DMA transmission of the user data is performed and the user data is written to the NAND 30.

Similarly, in the first embodiment, the SSD 10A includes, for example, the LUT 22. However, a device other than the SSD 10A may include, for example, the LUT 22. For example, instead of the SSD 10A, the host 40 may include at least one of the buffer area allocation/deallocation unit 12, the DMAC 13A, the buffer 14C, and the CPU 15A. In addition, for example, instead of the SSD 10A, the host 40 may include at least one of the buffer management table 21, the LUT 22, and the LUT dirty management tables 23A and 23B.

In this embodiment, the user data in the SSD 10A is managed using the logical address. However, the user data in the SSD 10A may be managed using information other than the logical address. In other words, logical identification information for logically identifying the user data may be the logical address or information other than the logical address. Therefore, the correspondence information of the buffer management table 21 may be information indicating the correspondence relationship between the logical identification information and the physical address in the buffer.

The logical identification information may be information other than the LBA or information obtained by adding information other than the LBA to the LBA. For example, when an object storage is used in the memory system, a unique ID which is provided for each object, such as a file, is used as the logical identification information.

There is a standard in which the LBA and a host ID are added to data and the data is read and write. The addition of the host ID (for example, a master ID or a name space ID) makes it possible for a plurality of hosts to share one SSD. For example, when the above-mentioned standard is used, the LBA having the host ID added thereto is used as the logical identification information.

Next, an example of the mounting of the SSDs 10A to 10C which are memory systems will be described. FIG. 16 is a diagram illustrating an example of the mounting of the memory system according to the first embodiment. Any one of the SSDs 10A to 10C is mounted on, for example, a server system 100. The server system 100 is formed by connecting a disk array 200 and a rack mount server 300 using a communication interface 400. The communication interface 400 may be based on any standard. The rack mount server 300 is formed by mounting one or more hosts 40 on a server rack.

The disk array 200 is formed by mounting one or more SSDs 10A to 10C and one or more hard disk units 8 on a server rack. The disk array 200 includes a power supply (not illustrated). Power is supplied from the power supply to each unit mounted on the disk array 200 through a backplane (not illustrated).

In the disk array 200, for example, one or more SSDs 10A to 10C are used as caches of one or more hard disk units. In the disk array 200, a storage controller unit forming an RAID may be mounted on one or more hard disk units 8.

The various units, modules, and devices that are described in the embodiments of the present application may each have a circuit or a hardware processor. In other words, the SSD 10A to 10D and the host 40D may be partly or wholly configured with software, hardware, or a combination of software and hardware.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
   a first memory to which user data transmitted from a host is written; and
   a control circuit configured to control the writing of the user data to the first memory,
   wherein the control circuit includes:
      a second memory configured to store the user data;
      a first correspondence information update circuit configured to update first correspondence information indicating a correspondence relationship between logical identification information for logically identifying the user data and a position of the user data in the first memory;
      a transmission control circuit configured to control transmission of the user data from the second memory to the first memory;
      a release processing circuit configured to perform a release process that enables a memory area that has become unnecessary among memory areas of the second memory to be used as a memory area for other data;
      a data management circuit configured to store data management information that indicates whether the user data can be read from the first memory or from the second memory; and
      a write instruction circuit, the write instruction circuit being configured to:
         transmit, to the first memory, a write instruction to perform a first write internal process, the first write internal process being a process in which the user data is written to the first memory,
         determine, on the basis of second correspondence information managed by the control circuit, whether a transmission process has been completed, wherein
            the transmission process is a process in which the transmission control circuit transmits the user data stored in the second memory to the first memory,
            the second correspondence information is information in which the logical identification information, a position of the user data in the second memory, update completion information, and transmission completion information are associated with each other, the update completion information is information that indicates whether an update process has been completed, the update process being a process in which the first correspondence information update circuit updates the first correspondence information using an address where the first write internal process is to be performed, and being a process that is started before the first write internal process is completed, the transmission completion information is information that indicates whether the transmission process has been completed, and transmit the write instruction to the first memory when the transmission process is completed, wherein, when the control circuit receives a write command from the host, the update process, a store process in which the second memory stores the user data corresponding to the write command, and the transmission process are performed, when the write instruction has been transmitted to the first memory, the first write internal process is performed, when the update process and the transmission process are completed, the release processing circuit performs the release process such that the memory area storing the user data can be used as the memory area for the other data, and, in a case where the control circuit receives, from the host, a read command that requests reading of the user data on which the first write internal process is not completed, the control circuit waits for the first write internal process to be completed without reading the user data.

2. The memory system according to claim 1,
wherein, when a process of storing, in a third memory, content of the update of the first correspondence information or a log corresponding to the content of the update is completed as the update process or an update reservation process in which the first correspondence information update circuit makes a reservation for the update of the first correspondence information, an update write process in which the transmission control circuit writes an updated portion of the first correspondence information to the first memory is performed, and, when the first write internal process and the update write process are completed, a second write internal process in which a log of management information for managing the first correspondence information is written to the first memory is performed.

3. The memory system according to claim 1,
wherein the update process and at least one of the store process and the transmission process are performed in parallel.

4. The memory system according to claim 1,
wherein, when the control circuit receives the write command from the host, an update reservation process in which the first correspondence information update circuit makes a reservation for the update of the first correspondence information is performed, and, when the first write internal process and the update reservation process are completed, the update process is performed.

5. The memory system according to claim 4,
wherein the update reservation process and at least one of the store process and the transmission process are performed in parallel.

6. The memory system according to claim 1,
wherein the release process which releases the memory area storing the user data and the first write internal process are performed in parallel.

7. The memory system according to claim 1,
wherein the control circuit determines whether the update process and the transmission process have been completed, on the basis of the second correspondence information.

8. The memory system according to claim 1,
wherein the control circuit further includes a second correspondence information update circuit configured to additionally record the logical identification information and the position in the second memory to the second correspondence information when the write command is received from the host.

9. The memory system according to claim 1,
wherein the control circuit further includes an address determination circuit configured to determine the position of the user data in the first memory when the write command is received from the host.

10. The memory system according to claim 9,
wherein the first correspondence information update circuit updates the first correspondence information by registering, in the first correspondence information, the position determined by the address determination circuit.

11. The memory system according to claim 1,
wherein, when a write-back process is completed during garbage collection, a third write internal process in which the user data is written to the first memory is performed, the garbage collection being a process in which the first memory is organized, the write-back process being a process in which the transmission control circuit transmits, to the first memory, the user data which has been read from the first memory as a garbage collection target and stored in the second memory, and, when the update process is completed and the write-back process is completed, the release processing circuit performs the release process such that the memory area storing the user data can be used as a memory area for other data.

12. The memory system according to claim 2,
wherein, when receiving a write command from the host during the update write process, the control circuit stops a process corresponding to the write command, and performs the process corresponding to the write command after the update write process is completed.

13. The memory system according to claim 2,
wherein the first write internal process and a process of transmitting the updated portion to the first memory are performed in parallel.

14. The memory system according to claim 2,
wherein the first write internal process and the update write process are performed in parallel.

15. The memory system according to claim 2,
wherein the first correspondence information is information in which the logical identification information, the position in the first memory, information indicating whether the first write internal process has been completed, and information indicating whether the update write process has been completed are associated with each other, and the transmission control circuit transmits the updated portion to the first memory at a time based on the first correspondence information.

16. The memory system according to claim 2, wherein, in the first correspondence information, information indicating whether the updated portion has not been written to the first memory and the logical identification information are associated with each other, and the transmission control circuit transmits the log of the management information to the first memory on the basis of the first correspondence information.

17. A memory system comprising:
a nonvolatile memory configured to store user data;
a buffer configured to temporarily store the user data; and
a controller circuit,
wherein, when the controller circuit receives, from a host, a first write command that requests first user data be written to the nonvolatile memory, the controller circuit stores the first user data in the buffer and updates first information regarding the first user data, the first information indicating a relationship between a logical address of the first user data and a physical address in the nonvolatile memory where the first user data is to be written, the controller circuit stores second information that indicates whether the first user data can be read from the nonvolatile memory or from the buffer,
when a transmission process in which the controller circuit transmits the first user data stored in the buffer to the nonvolatile memory is performed, the controller circuit:
determines, on the basis of correspondence information managed by the controller circuit, whether the transmission process has been completed, the correspondence information being information in which the first information, update completion information, and transmission completion information are associated with each other, the update completion information being information that indicates whether the updating of the first information regarding the first user data has been completed, the transmission completion information being information that indicates whether the transmission process has been completed, and transmits a write instruction to the nonvolatile memory when the transmission process is completed, wherein, before the first user data is completely written to the nonvolatile memory, the controller circuit updates the first information using the physical address in the nonvolatile memory where the first user data is to be written and releases a region in the buffer where the first user data is stored, and, in a case where the controller circuit receives, from the host, a first read command that requests reading of the first user data before the first user data is completely written to the nonvolatile memory, the controller circuit waits for the first user data to be completely written to the nonvolatile memory without reading the first user data.

\* \* \* \* \*